(12) United States Patent
Zhang et al.

(10) Patent No.: US 12,160,696 B2
(45) Date of Patent: *Dec. 3, 2024

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,124

(22) Filed: Nov. 6, 2023

(65) Prior Publication Data

US 2024/0073579 A1 Feb. 29, 2024

Related U.S. Application Data

(63) Continuation of application No. 17/817,011, filed on Aug. 3, 2022, now Pat. No. 11,818,529, which is a
(Continued)

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/10* (2006.01)
*G02C 11/00* (2006.01)
(Continued)

(52) U.S. Cl.
CPC ........... *H04R 1/1016* (2013.01); *G02C 11/00* (2013.01); *G02C 11/10* (2013.01); *G06F 3/16* (2013.01);
(Continued)

(58) Field of Classification Search
CPC .......... H04R 1/02; H04R 1/026; H04R 1/028; H04R 1/10; H04R 1/1008; H04R 1/1016;
(Continued)

(56) References Cited

U.S. PATENT DOCUMENTS 9,794,676 B2 10/2017 Shetye et al.
9,794,677 B2 10/2017 Shetye et al.
(Continued)

FOREIGN PATENT DOCUMENTS

CN 108650597 A 10/2018
CN 108712695 A 10/2018
(Continued)

OTHER PUBLICATIONS

International Search Report in PCT/CN2019/130921 mailed on Apr. 1, 2020, 6 pages.
(Continued)

*Primary Examiner* — Paul Kim
(74) *Attorney, Agent, or Firm* — METIS IP LLC

(57) ABSTRACT

The present disclosure discloses an acoustic output apparatus. The acoustic output apparatus may include at least one acoustic driver. The at least one acoustic driver may generate sound that is output through at least two sound guiding holes. Further, the acoustic output apparatus may include a supporting structure. The supporting structure may be configured to support the at least one acoustic driver. A baffle may be disposed between the at least two sound guiding
(Continued)

holes. The baffle may increase an acoustic distance from at least one sound guiding hole of the at least two sound guiding holes to a user's ear.

20 Claims, 27 Drawing Sheets

Related U.S. Application Data continuation of application No. 17/231,049, filed on Apr. 15, 2021, now Pat. No. 11,425,482, which is a continuation of application No. PCT/CN2019/130921, filed on Dec. 31, 2019.

(51) Int. Cl.

| | |
|---|---|
| *G06F 3/16* | (2006.01) |
| *G10L 21/0208* | (2013.01) |
| *G10L 21/038* | (2013.01) |
| *H04M 1/03* | (2006.01) |
| *H04M 1/78* | (2006.01) |
| *H04R 1/02* | (2006.01) |
| *H04R 1/22* | (2006.01) |
| *H04R 1/24* | (2006.01) |
| *H04R 1/26* | (2006.01) |
| *H04R 1/28* | (2006.01) |
| *H04R 1/34* | (2006.01) |
| *H04R 1/38* | (2006.01) |
| *H04R 1/44* | (2006.01) |
| *H04R 3/00* | (2006.01) |
| *H04R 3/02* | (2006.01) |
| *H04R 5/02* | (2006.01) |
| *H04R 5/033* | (2006.01) |
| *H04R 9/06* | (2006.01) |
| *H04S 7/00* | (2006.01) |
| *H04W 4/80* | (2018.01) |
| *G02C 11/06* | (2006.01) |
| *G10L 21/0216* | (2013.01) |

(52) U.S. Cl.
CPC .............. *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .... H04R 1/1025; H04R 1/1041; H04R 1/105; H04R 1/1075; H04R 1/1083; H04R 1/22; H04R 1/24; H04R 1/245; H04R 1/26; H04R 1/28; H04R 1/34; H04R 1/342; H04R 1/345; H04R 1/347; H04R 1/38; H04R 1/44; H04R 1/2803; H04R 1/2807; H04R 1/2811; H04R 1/2896; H04R 3/00; H04R 3/005; H04R 3/02; H04R 5/02; H04R 5/033; H04R 5/0335; H04R 9/06; H04R 2201/103; H04R 2420/07; H04R 2410/05; H04R 1/2842; H04R 1/2857; H04R 3/12; H04R 3/14; H04R 2201/401; H04R 2430/03; H04R 2430/21; H04R 2430/23; H04R 2460/13; H04R 2499/11; G06F 3/16; G06F 3/162; G06F 3/165; G06F 3/167; H04M 1/03; H04M 1/035; H04M 1/78; H04W 4/80; G10L 21/0208; G10L 21/038; G10L 2021/02166; H04S 7/304; H04S 2490/11; H04S 2400/11; G02C 11/00; G02C 11/06; G02C 11/10
USPC ........................................................ 381/381
See application file for complete search history.

(56) References Cited

U.S. PATENT DOCUMENTS

| | | | |
|---|---|---|---|
| 9,838,787 B1 | 12/2017 | Jeffery et al. | |
| 9,949,030 B2 | 4/2018 | Sun et al. | |
| 10,231,052 B2 | 3/2019 | Jeffery et al. | |
| 10,631,075 B1 | 4/2020 | Patil et al. | |
| 11,425,482 B2 * | 8/2022 | Zhang | H04W 4/80 |
| 11,818,529 B2 * | 11/2023 | Zhang | H04R 1/245 |
| 2006/0113143 A1 | 6/2006 | Ishida | |
| 2011/0311092 A1 | 12/2011 | Kosuda et al. | |
| 2012/0177206 A1 | 7/2012 | Yamagishi et al. | |
| 2013/0051585 A1 | 2/2013 | Karkkainen et al. | |
| 2014/0226843 A1 | 8/2014 | Pan | |
| 2017/0201823 A1 * | 7/2017 | Shetye | H04R 1/347 |
| 2017/0230741 A1 | 8/2017 | Matsuo et al. | |
| 2017/0353793 A1 | 12/2017 | Sun et al. | |
| 2017/0353796 A1 | 12/2017 | Jeffery et al. | |
| 2019/0052954 A1 * | 2/2019 | Rusconi Clerici Beltrami | G10K 11/26 |
| 2019/0238971 A1 | 8/2019 | Wakeland et al. | |
| 2021/0124185 A1 | 4/2021 | Wang et al. | |

FOREIGN PATENT DOCUMENTS

| | | |
|---|---|---|
| CN | 208572417 U | 3/2019 |
| CN | 208675298 U | 3/2019 |
| WO | 0225990 A1 | 3/2002 |

OTHER PUBLICATIONS

Written Opinion in PCT/CN2019/130921 mailed on Apr. 1, 2020, 6 pages.

* cited by examiner

ACOUSTIC OUTPUT APPARATUS

CROSS-REFERENCE TO RELATED APPLICATION

This application is a continuation of U.S. patent application Ser. No. 17/817,011, filed on Aug. 3, 2022, which is a continuation of U.S. patent application Ser. No. 17/231,049 (now U.S. Pat. No. 11,425,482), filed on Apr. 15, 2021, which is a continuation of International Application No. PCT/CN2019/130921, filed on Dec. 31, 2019, which claims priority to Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the contents of each of which are hereby incorporated by reference.

TECHNICAL FIELD

The present disclosure relates to the field of acoustics, and more particularly, relates to an acoustic output apparatus.

BACKGROUND

An open-ear acoustic output apparatus is a portable acoustic output apparatus that realizes sound conduction in a specific range. Compared with traditional in-ear and over-ear headphones, the open-ear acoustic output apparatus has characteristics of not blocking or covering an ear canal, which may allow a user to obtain sound information in external environment while listening to music, thereby improving the safety and the comfort level. Due to an open structure, a leaked sound of the open-ear acoustic output apparatus is more serious than that of a traditional earphone. Generally, two or more sound sources are used to construct a specific sound field and adjust a sound pressure distribution to reduce the leaked sound, which can reduce the leaked sound to a certain extent, but there are still certain limitations. For example, a volume of the sound sent to the user may be reduced while the leaked sound is suppressed. In addition, because sounds at different frequencies have different wavelengths, the suppression effect of the leaked sound at high-frequency is not good.

Therefore, it is desirable to provide an acoustic output apparatus that can simultaneously increase a volume of the sound heard by the user and reduce the leaked sound.

SUMMARY

One aspect of the present disclosure provides an acoustic output apparatus. The acoustic output apparatus may include at least one acoustic driver. The at least one acoustic driver may generate sound that is output through at least two sound guiding holes. Further, the acoustic output apparatus may include a supporting structure. The supporting structure may be configured to support the at least one acoustic driver. A baffle may be disposed between the at least two sound guiding holes. The baffle may increase an acoustic distance from at least one sound guiding hole of the at least two sound guiding holes to a user's ear.

In some embodiments, the at least one acoustic driver may include a vibration diaphragm. A front side of the vibration diaphragm in the supporting structure may be provided with a front chamber for transmitting sound. The front chamber may be acoustically coupled with one sound guiding hole of the at least two sound guiding holes. A rear side of the vibration diaphragm in the supporting structure may be provided with a rear chamber for transmitting sound. The rear chamber may be acoustically coupled with another sound guiding hole of the at least two sound guiding holes.

In some embodiments, the at least two sound guiding holes may output at least one set of sounds having a phase difference.

In some embodiments, the at least two sound guiding holes may output at least one set of sounds with opposite phases.

In some embodiments, the supporting structure may be configured such that each of the at least two sound guiding holes is located on a front side of the user's ear.

In some embodiments, the baffle and a connection line between the at least two sound guiding holes may form an included angle. The included angle may be less than or equal to 90 degrees.

In some embodiments, a distance between the at least two sound guiding holes may be less than or equal to 12 cm.

In some embodiments, a ratio of a height of the baffle to a distance between the at least two sound guiding holes may be less than or equal to 5.

In some embodiments, a ratio of a height of the baffle to a distance between the at least two sound guiding holes may be less than or equal to 3.

In some embodiments, a ratio of a height of the baffle to a distance between the at least two sound guiding holes may be less than or equal to 2.

In some embodiments, a ratio of a height of the baffle to a distance between the at least two sound guiding holes may be less than or equal to 1.8.

In some embodiments, the at least two sound guiding holes may include a first sound guiding hole and a second sound guiding hole. The first sound guiding hole and the user's ear may be located at one side of the baffle. The second sound guiding hole may be located at another side of the baffle. An acoustic distance from the first sound guiding hole to the user's ear may be less than an acoustic distance from the second sound guiding hole to the user's ear.

In some embodiments, the at least two sound guiding holes may be located on a same side of the user's ear. A ratio of a distance between a sound guiding hole, which is closer to the user's ear, of the at least two sound guiding holes and the user's ear to a distance between the at least two sound guiding holes may be less than or equal to 3.

In some embodiments, the at least two sound guiding holes may be located on a same side of the user's ear. A ratio of a distance between a sound guiding hole, which is closer to the user's ear, of the at least two sound guiding holes and the user's ear to a distance between the at least two sound guiding holes may be less than or equal to 1.

In some embodiments, the at least two sound guiding holes may be located on a same side of the user's ear. A ratio of a distance between a sound guiding hole, which is closer to the user's ear, of the at least two sound guiding holes and the user's ear to a distance between the at least two sound guiding holes may be less than or equal to 0.9.

In some embodiments, a ratio of a height of the baffle to a distance between the at least two sound guiding holes may be less than or equal to 1.

In some embodiments, a ratio of a distance between a center of the baffle and a connection line between the at least two sound guiding holes to a height of the baffle may be less than or equal to 2.

In some embodiments, a ratio of a distance between a center of the baffle and a connection line between the at least two sound guiding holes to a height of the baffle may be less than or equal to 1.4.

In some embodiments, the baffle may have a plate structure made of acoustic resistance material.

In some embodiments, the baffle may be provided with an acoustic structure. The acoustic structure may at least partially absorb sound passing through the baffle.

In some embodiments, the baffle may be provided with acoustic resistance material that changes an acoustic impedance of the baffle.

In some embodiments, the acoustic resistance material may include plastic, textile, metal, permeable material, woven material, screen material, mesh material, porous material, particulate material, and/or polymer material.

In some embodiments, the acoustic resistance material may have an acoustic impedance. The acoustic impedance may be in a range of 5-500 MKS Rayleigh.

In some embodiments, one of the at least two sound guiding holes may be located on a side of the supporting structure facing the user's ear. Another one of the at least two sound guiding holes may be located on a side of the supporting structure facing away from the user's ear.

In some embodiments, the baffle may be a plate structure with a uniform width or a width that decreases or increases sequentially from top to bottom.

BRIEF DESCRIPTION OF THE DRAWINGS

The present disclosure is further illustrated in terms of exemplary embodiments. These exemplary embodiments are described in detail with reference to the drawings. These embodiments are not restrictive. In these embodiments, the same number represents the same structure, wherein.

DETAILED DESCRIPTION

Figure 1:
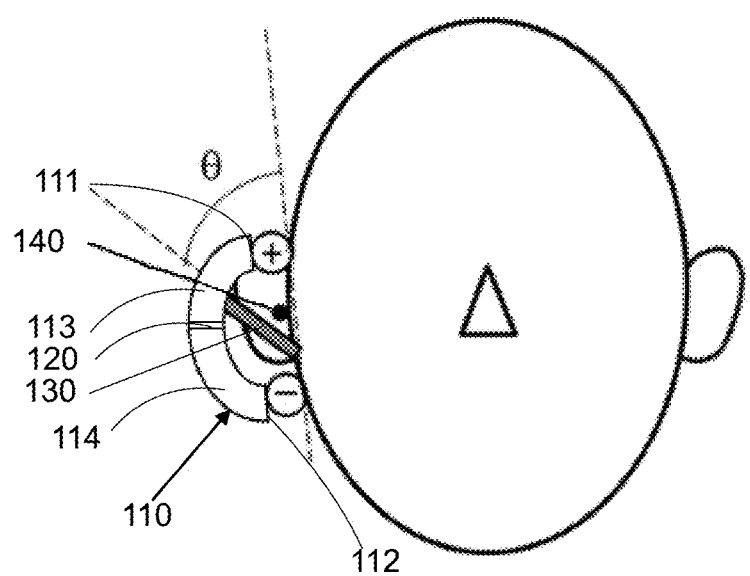
FIG. 1 is a schematic diagram illustrating an exemplary structure of an acoustic output apparatus according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

It will be understood that the terms "system," "device," "unit," and/or "module" are used herein to distinguish different components, elements, parts, sections, or assemblies of different levels. However, if other expressions may achieve the same purpose, the terms may be replaced by the other expressions.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

The present disclosure describes an acoustic output apparatus including at least one acoustic driver. When a user wears the acoustic output apparatus, the acoustic output apparatus may be at least located on a side of a head of the user, close to but not blocking ears of the user. The acoustic output apparatus may be worn on the head of the user (e.g., using glasses, headbands, or other structures) or other body portions (e.g., a neck/shoulder area) of the user, or placed near the ears of the user by other manners (e.g., handheld by the user). The sound generated by the at least one acoustic driver in the acoustic output apparatus may be transmitted outwards through two sound guiding holes acoustically coupled with the at least one acoustic driver. For example, the two sound guiding holes may respectively transmit sounds with a same (or approximately same) amplitude and opposite (or approximately opposite) phases outwards. In some embodiments, a baffle structure may be provided on the acoustic output apparatus, so that the two sound guiding holes may be respectively located on both sides of the baffle, which may increase an acoustic distance difference of sounds transmitted from the two sound guiding holes to a user's ear (that is, a difference in sound distances from the two sound guiding holes to the user's ear canal), thereby weakening the effect of sound cancellation, increasing a volume of sound heard by the user's ear (also referred to as near-field sound or heard sound), and providing the user with a better listening experience. In addition, the baffle may have little effect on sounds transmitted from the sound guiding holes to the environment (also referred to as far-field sound). The far-field sounds generated by the two sound guiding holes may cancel each other, which may suppress the sound leakage of the acoustic output apparatus and prevent the sound generated by the acoustic output apparatus from being heard by others near the user.

FIG. 1 is a schematic structural diagram illustrating an exemplary structure of an acoustic output apparatus according to some embodiments of the present disclosure. As shown in FIG. 1, the acoustic output apparatus 100 may include a supporting structure 110 and an acoustic driver 120 mounted within the supporting structure. In some embodiments, the acoustic output apparatus 100 may be worn on a user's body (for example, the human body's head, neck, or upper torso) through the supporting structure 110. At the same time, the supporting structure 110 and the acoustic driver 120 may approach but not block the ear canal, so that the user's ears may remain open, thus the user may hear both the sound output by the acoustic output apparatus 100, and the sound of the external environment. For example, the acoustic output apparatus 100 may be arranged around or partially around the user's ear, and transmit sounds by means of air conduction or bone conduction.

The supporting structure 110 may be used to be worn on the user's body, and may include one or more acoustic drivers 120. In some embodiments, the supporting structure 110 may have an enclosed shell structure with a hollow interior, and the one or more acoustic drivers 120 may be located inside the supporting structure 110. In some embodiments, the acoustic output apparatus 100 may be combined with a product, such as glasses, a headset, a head-mounted display device, an AR/VR helmet, etc. In this case, the supporting structure 110 may be fixed near the user's ear in a hanging or clamping manner. In some alternative embodiments, a hook may be provided on the supporting structure 110, and the shape of the hook may match the shape of the auricle, so that the acoustic output apparatus 100 may be independently worn on the user's ear through the hook. The acoustic output apparatus 100 worn independently may communicate with a signal source (for example, a computer, a mobile phone, or other mobile devices) in a wired or wireless manner (for example, Bluetooth). For example, the acoustic output apparatus 100 at the left and right ears may be directly in communication connection with the signal source in a wireless manner. As another example, the acoustic output apparatus 100 at the left and right ears may include a first output device and a second output device. The first output device may be in communication connection with the signal source, and the second output device may be wirelessly connected with the first output device in a wireless manner. The audio output of the first output device and the second output device may be synchronized through one or more synchronization signals. A wireless connection disclosed herein may include but is not limited to a Bluetooth, a local area network, a wide area network, a wireless personal area network, a near field communication, or the like, or any combination thereof.

In some embodiments, the supporting structure 110 may have a shell structure with a shape suitable for human ears, such as a circular ring, an oval, a polygonal (regular or irregular), a U-shape, a V-shape, a semi-circle, so that the supporting structure 110 may be directly hooked at the user's ear. In some embodiments, the supporting structure 110 may include one or more fixed structures. The fixed structure(s) may include an ear hook, a head strip, or an elastic band, so that the acoustic output apparatus 100 may be better fixed on the user's body, preventing the acoustic output apparatus 100 from falling down. Merely by way of example, the elastic band may be a headband to be worn around the head region. As another example, the elastic band may be a neckband to be worn around the neck/shoulder region. In some embodiments, the elastic band may be a continuous band and be elastically stretched to be worn on the user's head. Meanwhile, the elastic band may also exert pressure on the user's head so that the acoustic output apparatus 100 may be fixed to a specific position on the user's head. In some embodiments, the elastic band may be a discontinuous band. For example, the elastic band may include a rigid portion and a flexible portion. The rigid portion may be made of a rigid material (for example, plastic or metal), and the rigid portion may be fixed to the supporting structure 110 of the acoustic output apparatus 100 by a physically connection (for example, a snap connection, a threaded connection, etc.). The flexible part may be made of an elastic material (for example, cloth, composite or/and neoprene).

In some embodiments, when the user wears the acoustic output apparatus 100, the supporting structure 110 may be located on the peripheral side of the auricle. For example, the supporting structure 110 may be located above, below, in front of, or behind the auricle. The supporting structure 110 may also be provided with a sound guiding hole 111 and a sound guiding hole 112 for transmitting sound. In some embodiments, the sound guiding hole 111 and the sound guiding hole 112 may be located on a front side of the user's auricle, respectively, and the acoustic driver 120 may output sounds through the sound guiding hole 111 and the sound guiding hole 112. A volume of a sound of the acoustic output apparatus 100 at any point in the space may be related to a distance from the point to the sound guiding hole 111 and the sound guiding hole 112. Merely by way of example, as shown in FIG. 1, the sound guiding hole 111 and the sound guiding hole 112 may respectively output sounds with a same amplitude and opposite phases (represented by the symbols "+" and "−"). In such cases, when the distance from the point in the space to the sound guiding hole 111 is equal to the distance from the point in the space to the sound guiding hole 112, a volume of a sound at the point may be relatively small according to the principle of interference cancellation. When the distance from the point in the space to the sound guiding hole 111 is not equal to the distance from the point in the space to the sound guiding hole 112, the greater difference of the two distances, the greater the volume of the sound at the point.

The acoustic driver 120 may be a component that may receive an electrical signal and convert the electrical signal into sound for output. In some embodiments, in terms of frequency, the type of acoustic driver 120 may include a low-frequency (for example, 30 Hz-150 Hz) acoustic driver, a mid-low-frequency (for example, 150 Hz-500 Hz) acoustic driver, a mid-high-frequency (for example, 500 Hz-5 kHz) acoustic driver, a high-frequency (for example, 5 kHz-16 kHz) acoustic driver, or a full-frequency (for example, 30 Hz-16 kHz) acoustic driver, or any combination thereof. Of course, the low frequency, high frequency, etc. mentioned herein may merely represent an approximate range of the frequency, and different division manners may be used in different application scenarios. For example, a frequency division point may be determined. Low frequency may represent a frequency range below the frequency division point, and high frequency may represent a frequency range above the frequency division point. The frequency division point may be an arbitrary value within the audible range of the human ear, for example, 500 Hz, 600 Hz, 700 Hz, 800 Hz, 1000 Hz, etc. In some embodiments, in terms of a principle, the acoustic driver 120 may include but is not limited to a moving coil driver, a moving iron driver, a piezoelectric driver, an electrostatic driver, a magnetostrictive driver, or the like.

In some embodiments, the acoustic driver 120 may include a vibration diaphragm. When the vibration diaphragm vibrates, sounds may be transmitted from the front and rear sides of the vibration diaphragm, respectively. The front side of the vibration diaphragm in the supporting structure 110 may be provided with a front chamber 113 for transmitting sound. The front chamber 113 may be acoustically coupled with the sound guiding hole 111, and the sound on the front side of the vibration diaphragm may be outputted from the sound guiding hole 111 through the front chamber 113. The rear side of the vibration diaphragm in the supporting structure 110 may be provided with a rear chamber 114 for transmitting sound. The rear chamber 114 may be acoustically coupled with the sound guiding hole 112, and the sound on the rear side of the vibration diaphragm may be outputted from the sound guiding hole 112 through the rear chamber 114. It should be noted that, when the vibration diaphragm is vibrating, the front and rear sides of the vibration diaphragm may simultaneously generate sounds with a same amplitude and opposite phases. In some embodiments, by adjusting the structure of the front chamber 113 and the rear chamber 114, the sounds output by the acoustic driver 120 at the sound guiding hole 111 and the sound guiding hole 112 may meet specific conditions. For example, by designing the lengths of the front chamber 113 and the rear chamber 114, the sound guiding hole 111 and the sound guiding hole 112 may output sounds with a specific phase relationship (for example, opposite phases). Therefore, the problems including a small volume of the sound heard by the user in the near field of the acoustic output apparatus 100 and a large sound leakage in the far field of the acoustic output apparatus 100 may be effectively solved.

In some alternative embodiments, the acoustic driver 120 may also include a plurality of vibration diaphragms (for example, two vibration diaphragms). Each of the plurality of vibration diaphragms may vibrate respectively to generate sounds, which may respectively pass through different cavities connected to the vibration diaphragms in the supporting structure, and output from corresponding sound guiding holes. The plurality of vibration diaphragms may be controlled by the same controller or different controllers and generate sounds that meet certain phase and amplitude conditions (for example, sounds with the same amplitude but opposite phases, sounds with different amplitudes and opposite phases, etc.).

In some embodiments, the acoustic output apparatus may further include a plurality of acoustic drivers. The plurality of acoustic drivers may be controlled by the same or different controllers, and generate sounds that meet a certain phase and amplitude condition. Merely by way of example, the acoustic output apparatus may include a first acoustic driver and a second acoustic driver. The controller(s) may control, through a control signal, the first acoustic driver and the second acoustic driver to generate sounds that meet the certain phase and amplitude condition (for example, sounds with a same amplitude but opposite phases, sounds with different amplitudes and opposite phases, etc.). The first acoustic driver may output sound from at least one first sound guiding hole, and the second acoustic driver may output sound from at least one second sound guiding hole. The first sound guiding hole and the second sound guiding hole may be respectively located on both sides of a baffle. It should be noted that a count of acoustic driver(s) may be not limited to the above two, but may also be three, four, five, etc. Sound parameters (for example, phase, frequency, and/or amplitude) of each acoustic driver may be adjusted according to actual needs.

In some embodiments, the acoustic output apparatus 100 may further include a baffle 130. As shown in FIG. 1, the sound guiding hole 111 and the sound guiding hole 112 may be located on both sides of the baffle 130 respectively. An angle θ may be formed between the baffle 130 and a connection line between the sound guiding hole 111 and the sound guiding hole 112. In such cases, the baffle 130 may be configured to adjust acoustic distances from the sound guiding hole 111 and the sound guiding hole 112 to the user's ear (that is, the listening position). A count of the baffle(s) 130 may be one or more. For example, one or more baffles 130 may be provided between the sound guiding hole 111 and the sound guiding hole 112. As another example, when the acoustic output apparatus 100 further includes sound guiding hole(s) other than the sound guiding hole 111 and the sound guiding hole 112, one or more baffles 130 may be provided between every two sound guiding holes. In some embodiments, the baffle 130 may be fixedly connected to the supporting structure 110. For example, the baffle 130 may be a part of the supporting structure 110 or integrally formed with the supporting structure 110. In other embodiments, the baffle 130 may be connected with other components (for example, an outer shell of the acoustic output apparatus 100) of the acoustic output apparatus 100.

In order to further illustrate the influence of the distribution of the sound guiding holes on both sides of the baffle on the sound output effect of the acoustic output apparatus, in the present disclosure, the acoustic output apparatus and the baffle may be equivalent to a model including two point sources and the baffle.

Just for the convenience of description and for the purpose of illustration, when sizes of the sound guiding holes on the acoustic output apparatus are small, each sound guiding hole may be approximately regarded as a point source. The sound field sound pressure p generated by a single point source may satisfy Equation (1):

$$p = \frac{j\omega\rho_0}{4\pi r}Q_0 \exp j(\omega t - kr), \quad (1)$$

where ω denotes an angular frequency, ρ0 denotes an air density, r denotes a distance between a target point and the point source, Q0 denotes a volume velocity of the point source, and k denotes the wave number. It may be concluded that the magnitude of the sound field pressure of the point source at the target point is inversely proportional to the distance from the target point to the point source.

Two sound guiding holes (for example, the sound guiding hole 111 and the sound guiding hole 112) may be set on the acoustic output apparatus 100. In this case, two point sources may be formed, which may reduce sound transmitted from the acoustic output apparatus 100 to the surrounding environment (i.e., far-field sound leakage). In some embodiments, the sound output from two sound guiding holes, that is, two point sources, may have a certain phase difference. When the distance and the phase difference between the two point sources meet a certain condition, the acoustic output apparatus may output different sound effects in the near field and the far field. For example, if the phases of the two point sources corresponding to the two sound guiding holes are opposite, that is, an absolute value of the phase difference between the two point sources is 180 degrees, the far-field leakage (also referred to as far-field sound leakage) may be reduced according to the principle of reversed phase sound cancellation.

Figure 2:
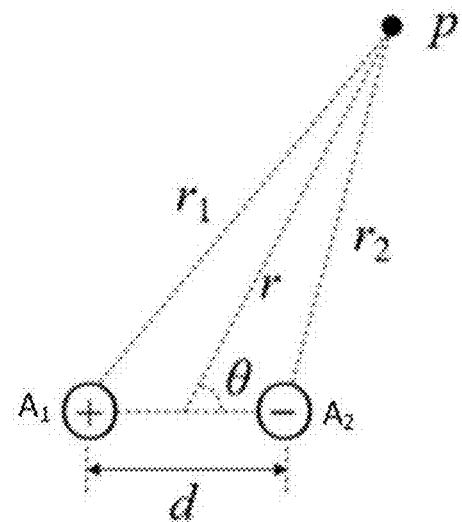
FIG. 2 is a schematic diagram illustrating two point sources according to some embodiments of the present disclosure.

As shown in FIG. 2, a sound field pressure p generated by two point sources may satisfy the Equation:

$$p = \frac{A_1}{r_1}\exp j(\omega t - kr_1 + \varphi_1) + \frac{A_2}{r_2}\exp j(\omega t - kr_2 + \varphi_2), \quad (2)$$

where $A_1$ and $A_2$ denote intensities of the two point sources, $\varphi_1$ and $\varphi_2$ denote phases of the two point sources, respectively, d denotes a distance between the two point sources, and $r_1$ and $r_2$ may satisfy Equation (3):

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r denotes a distance between a target point and the center of the two point sources in the space, and θ represents an angle between a line connecting the target point and the center of the two point sources and the line where the two point sources are located.

It may be concluded from Equation (3) that a magnitude of the sound pressure p at the target point in the sound field may relate to the intensity of each point source, the distance d, the phase of each point source, and the distance r.

Figure 3:
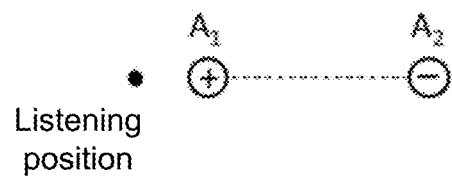
FIG. 3 is a schematic diagram illustrating two point sources and a listening position according to some embodiments of the present disclosure.
Figure 4:
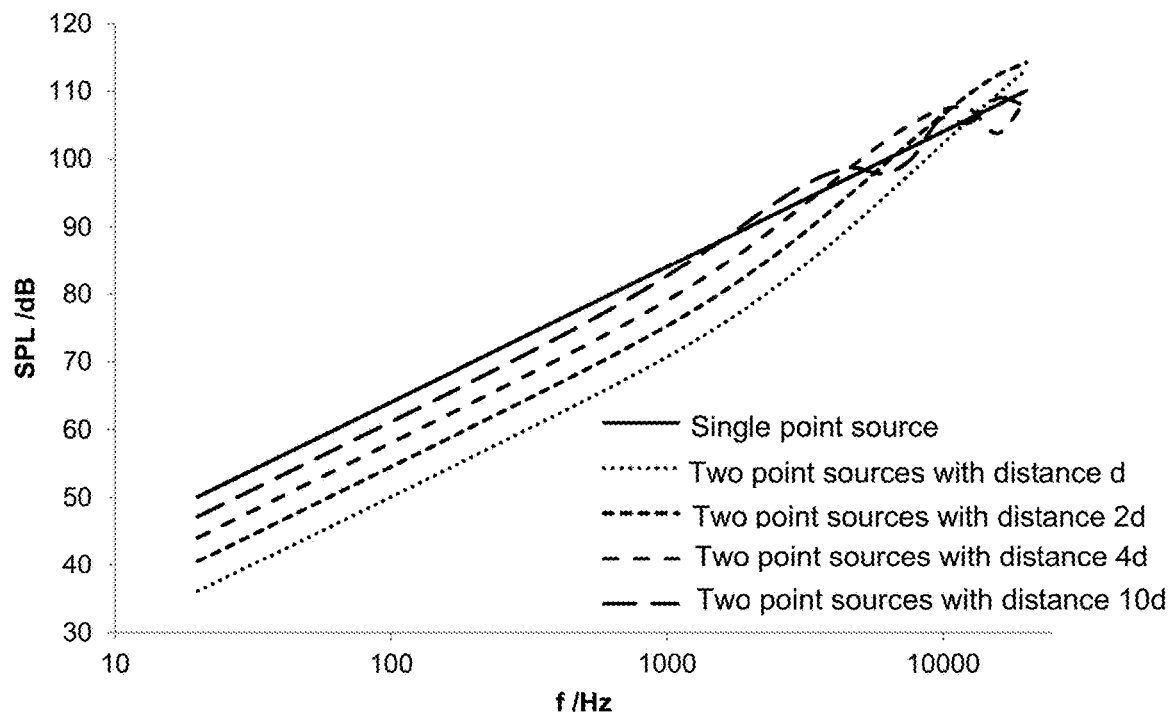
FIG. 4 is a graph illustrating frequency response curves of two point sources with different distances at a near-field listening position according to some embodiments of the present disclosure.

FIG. 3 is a schematic diagram illustrating two point sources and a listening position according to some embodiments of the present disclosure. FIG. 4 is a graph illustrating frequency response curves of two point sources with different distances at a near-field listening position according to some embodiments of the present disclosure. In some embodiments, the listening position may be taken as a target point to further illustrate a relationship between a sound pressure at the target point and the distance d between the two point sources. As used herein, the listening position may be used to indicate a position of the user's ear (for example, a position of the ear hole 140 shown in FIG. 1). The sound at the listening position may be used to represent the near-field sound generated by two point sources. It should be noted that "near-field sound" may refer to a sound within a certain range from a sound source (for example, the point source equivalent to the sound guiding hole 111), for example, a sound within 0.2 m from the sound source. Merely by way of example, as shown in FIG. 3, a point source $A_1$ and a point source $A_2$ may be located on a same side of the listening position, and the point source $A_1$ may be closer to the listening position. The point source $A_1$ and the point source $A_2$ may output sounds with the same amplitude but opposite phases. As shown in FIG. 4, as the distance between the point source $A_1$ and the point source $A_2$ gradually increases (for example, from d to 10d), the sound volume of the listening position may gradually increase. This is, as the distance between the point source $A_1$ and the point source $A_2$ increases, the difference in sound pressure amplitude (that is, the sound pressure difference) between the two sounds reaching the listening position may become larger, and the acoustic route difference may become larger, which may make the sound canceling effect weaker and increase the sound volume at the listening position. However, due to the existence of the sound cancellation, the sound volume at the listening position may be still lower than the sound volume generated by a single point source at a same location and having a same intensity in the mid-low-frequency band (for example, a frequency less than 1000 Hz). However, in the high-frequency band (for example, a frequency close to 10000 Hz), due to the decrease of the sound wavelength, mutual enhancement of the sound may appear, making the sound generated by the two point sources louder than that of the single point source. In the embodiments of the present disclosure, a sound pressure amplitude, that is, a sound pressure, may refer to the pressure generated by the sound through the vibration of the air.

Figure 5:
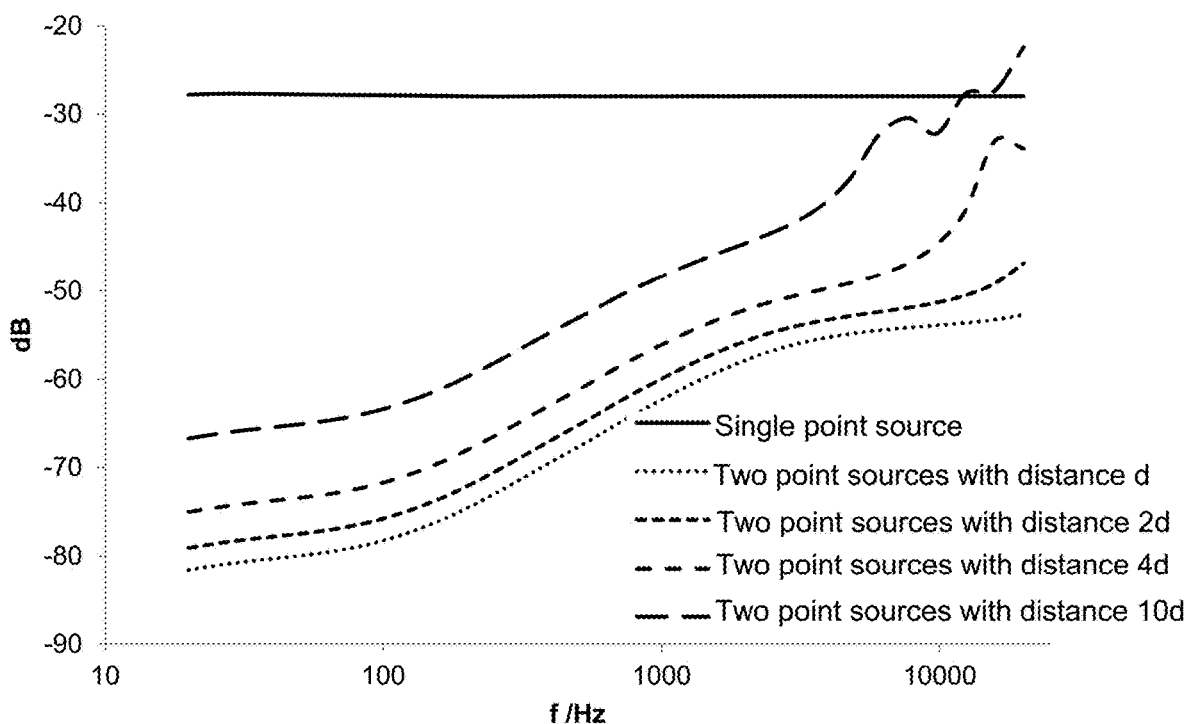
FIG. 5 is a graph illustrating sound leakage indexes of two point sources with different distances in a far field according to some embodiments of the present disclosure.

In some embodiments, by increasing the distance between the two point sources (for example, the point source $A_1$ and the point source $A_2$), the sound volume at the listening position may be increased, but as the distance increases, the sound cancellation of the two point sources may become weaker, which may lead to an increase of the far-field sound leakage. For illustration purposes, FIG. 5 is a graph illustrating sound leakage indexes (also referred to as normalization parameters) of two point sources with different distances in a far field according to some embodiments of the present disclosure. As shown in FIG. 5, a far-field sound leakage index of a single point source may be taken as a reference, as the distance between two point sources increases from d to 10d, the far-field sound leakage index may gradually increase, which indicates that the sound leakage becomes larger. More descriptions regarding the sound leakage index may be found in equation (4) and related descriptions.

Figure 6:
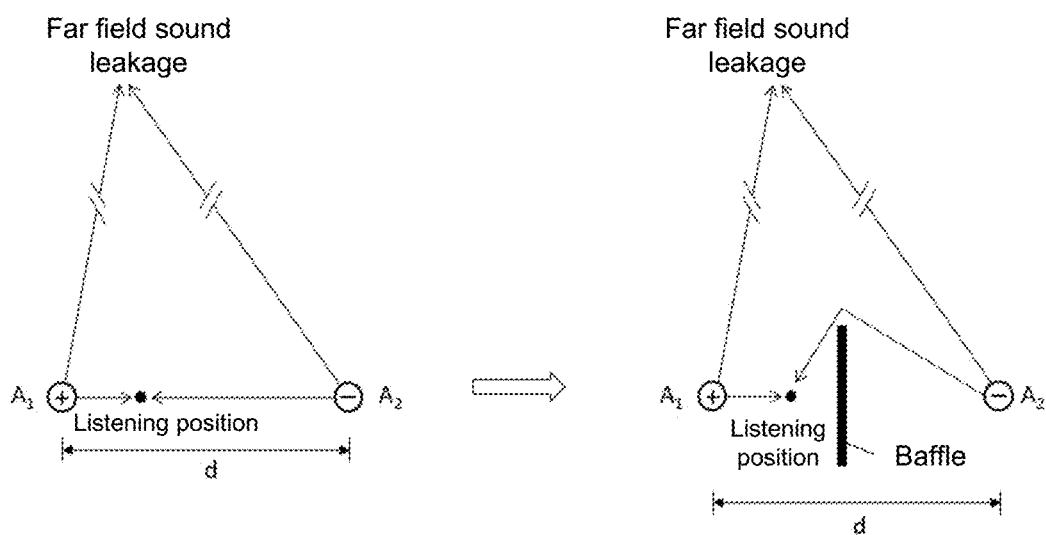
FIG. 6 is a schematic diagram illustrating an exemplary baffle provided between two point sources according to some embodiments of the present disclosure.

In some embodiments, adding a baffle to the acoustic output apparatus may be beneficial to improve the output effect of the acoustic output apparatus, that is, to increase the sound intensity at the near-field listening position, while reducing the volume of far-field sound leakage. For illustration purposes, FIG. 6 is a schematic diagram illustrating an exemplary baffle provided between two point sources according to some embodiments of the present disclosure. As shown in FIG. 6, when a baffle is provided between the point source $A_1$ and the point source $A_2$, in the near field, the sound field of the point source $A_2$ may need to bypass the baffle to interfere with the sound wave of the point source $A_1$ at the listening position, which may be equivalent to increasing the acoustic route from the point source $A_2$ to the listening position. Therefore, assuming that the point source $A_1$ and the point source $A_2$ have a same amplitude, compared to the case without a baffle, the amplitude difference between the sound waves of the point source $A_1$ and the point source $A_2$ at the listening position may increase, so that the degree of cancellation of the two sounds at the listening position may decrease, causing the volume at the listening position to increase. In the far field, since the sound waves generated by the point source $A_1$ and the point source $A_2$ do not need to bypass the baffle in a large space, the sound waves may interfere (similar to the case without a baffle). Compared to the case without a baffle, the sound leakage in the far field may not increase significantly. Therefore, a baffle structure provided between the point source $A_1$ and the point source $A_2$ may significantly increase the sound volume at the near-field listening position while the volume of the far-field sound leakage.

More descriptions regarding the specific meaning and related content of the sound leakage index may refer to the following description. In the application of the open acoustic output apparatus, it may be necessary to ensure that a sound pressure $P_{ear}$ at the listening position is large enough to meet the listening needs. Meanwhile, it may be necessary to ensure that a sound pressure $P_{far}$ at the far field is small enough to reduce sound leakage. Therefore, the sound leakage index α may be used as an index to evaluate the ability to reduce the sound leakage.

$$\alpha = \frac{|P_{far}|^2}{|P_{ear}|^2}. \quad (4)$$

It may be concluded from Equation (4) that, the smaller the sound leakage index is, the stronger the ability of the acoustic output apparatus to reduce the sound leakage may be. When the volume of the near-field sound at the listening position remains unchanged, the smaller the sound leakage index is, the smaller the far-field sound leakage may be.

Figure 7:
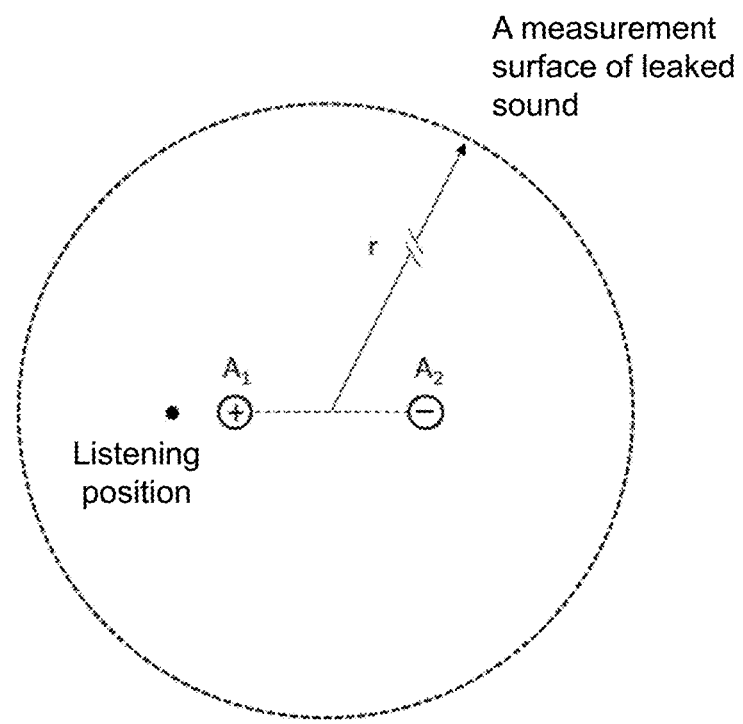
FIG. 7 is a schematic diagram illustrating an exemplary measurement manner of sound leakage according to some embodiments of the present disclosure.

FIG. 7 is a schematic diagram illustrating an exemplary measurement manner of sound leakage according to some embodiments of the present disclosure. As shown in FIG. 7, a listening position may be located on a left side of a point source $A_1$. A measurement manner of the leakage sound may be that a plurality of points on a spherical surface centered by a center point of the two point sources (for example, $A_1$ and $A_2$ in FIG. 7) with a radius of r may be identified, and an average value of amplitudes of the sound pressure at the plurality of points may be determined as a value of the sound leakage. It should be noted that the measurement manner of the leakage sound may merely serve as an exemplary illustration, which may be not limited. The manner for measuring and determining the sound leakage may be adjusted according to the actual conditions. For example, one or more points in the far field may be taken as the position for measuring the sound leakage. As another example, a center of the two point sources may be used as a center of a circle at the far field, and sound pressure amplitudes of two or more points evenly distributed at the circle according to a certain spatial angle may be averaged as the value of the sound leakage. In some embodiments, a measurement manner of the sound heard by the user may be that a location point near the point source may be identified as a listening position, and an amplitude of the sound pressure measured at the listening position may be determined as a volume of the sound heard by the user. In some embodiments, the listening position may be on the connection line between two point sources or not on the connection line between two point sources. The manner for measuring and determining the volume of the sound heard by the user may be adjusted according to the actual conditions. For example, the sound pressure amplitudes of other points or one or more points in the near field may be averaged as the volume of the sound heard by the user. As another example, a certain point source may be used as a center of a circle at the near field, and the sound pressure amplitudes of two or more points evenly distributed at the circle according to a certain spatial angle may be averaged as the volume of the sound heard by the user. In some embodiments, a distance between the near-field listening position and a point source may be far less than a distance between the point source and the spherical surface for measuring the far-field sound leakage.

It should be noted that the sound guiding holes for outputting sound as point sources may merely serve as an illustration of the principle and effect in the present disclosure, and may not limit the shapes and sizes of the sound guiding holes in practical applications. In some embodiments, if an area of a sound guiding hole is large, the sound guiding hole may also be equivalent to a surface source radiating sound outward. In some embodiments, the point source may also be realized by other structures, such as a vibration surface, a sound radiation surface, etc. For those skilled in the art, without creative activities, it may be known that the sound generated by structures such as a sound guiding hole, a vibration surface, a sound radiation surface, or the like may be equivalent to a point source at the spatial scale discussed in the present disclosure, and may have the same sound propagation characteristics and the same mathematical description. Further, for those skilled in the art, without creative activities, it may be known that the acoustic effect achieved by "an acoustic driver may outputting sound from at least two first sound guiding holes" described in the present disclosure may also achieve the same effect by other acoustic structures, for example, "at least two acoustic drivers each may output sound from at least one sound radiation surface". According to actual conditions, other acoustic structures may be selected for adjustment and combination, and the same acoustic output effect may also be achieved. The principle of radiating sound outward with structures such as surface sources may be similar to that of point sources, which may not be repeated here. Further, a count of sound guiding holes (point source or surface source) on the acoustic output apparatus may not be limited to two, which may be three, four, five, etc., thereby forming a plurality of sets of two point/surface sources or a set of multi-point/surface sources, which may not be limited herein and may achieve the technical effects that can be achieved by the two point sources in the present disclosure.

In order to further explain the effect on the sound output effect with or without a baffle between the two point sources or the two sound guiding holes, the volume of the near-field sound at the listening position or/and the volume of the far-field leakage under different conditions may be specifically described below.

Figure 8:
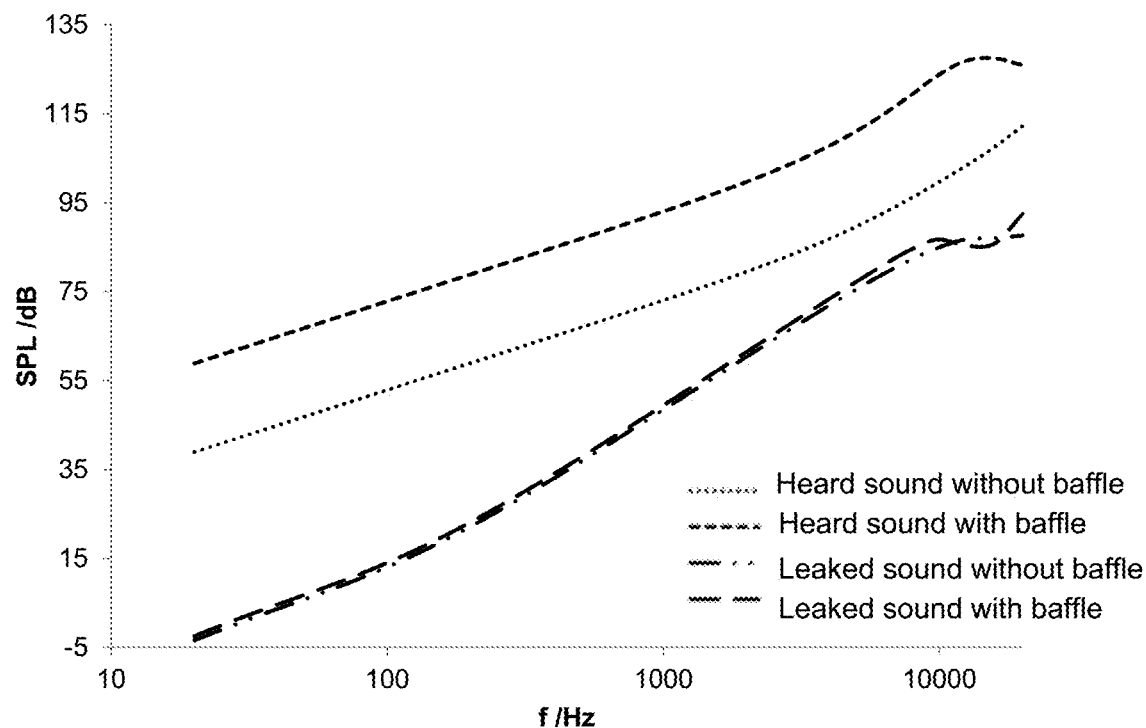
FIG. 8 is a graph illustrating frequency response curves of two point sources with and without a baffle between two point sources according to some embodiments of the present disclosure.

FIG. 8 is a graph illustrating frequency response curves of two point sources with and without a baffle between two point sources according to some embodiments of the present disclosure. As shown in FIG. 8, after adding a baffle between the two point sources (that is, two sound guiding holes) of the acoustic output apparatus, in the near field, it may be equivalent to increasing the distance between the two point sources, and the volume at the near-field listening position may be equivalent to being generated by a set of two point sources with a larger distance. The volume of the near-field sound may be significantly increased compared to the case without a baffle. In the far field, since the interference of the sound waves generated by the two point sources is rarely affected by the baffle, the sound leakage may not change significantly with or without the baffle. It may be seen that by setting a baffle between the two sound guiding holes (two point sources), the capability of the output device to reduce sound leakage may be effectively improved, the volume of the near-field sound of the acoustic output apparatus may be significantly increased. Therefore, the requirements for sound generation components of the acoustic output apparatus may be greatly reduced, which may reduce the electrical loss of the acoustic output apparatus at the same time, so that the working time of the acoustic output apparatus may be greatly prolonged under a certain amount of electricity.

Figure 9:
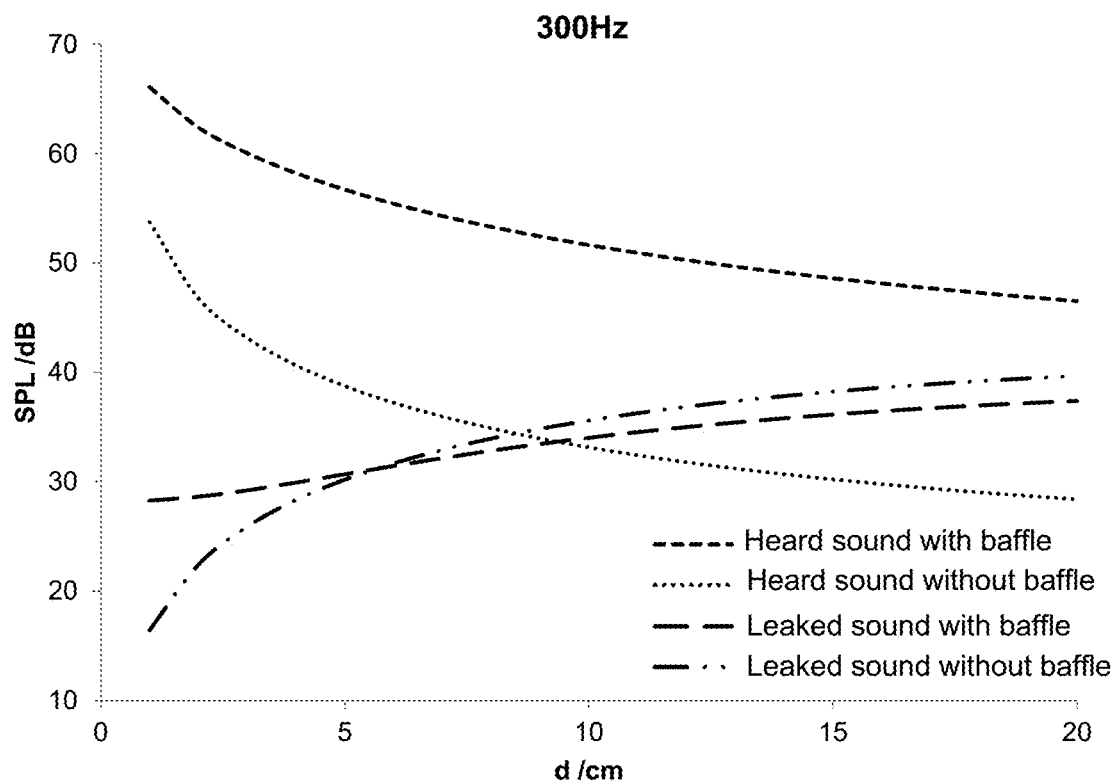
FIG. 9 is a graph illustrating sound pressure amplitude curves of two point sources with different distances at a frequency of 300 Hz according to some embodiments of the present disclosure.
Figure 10:
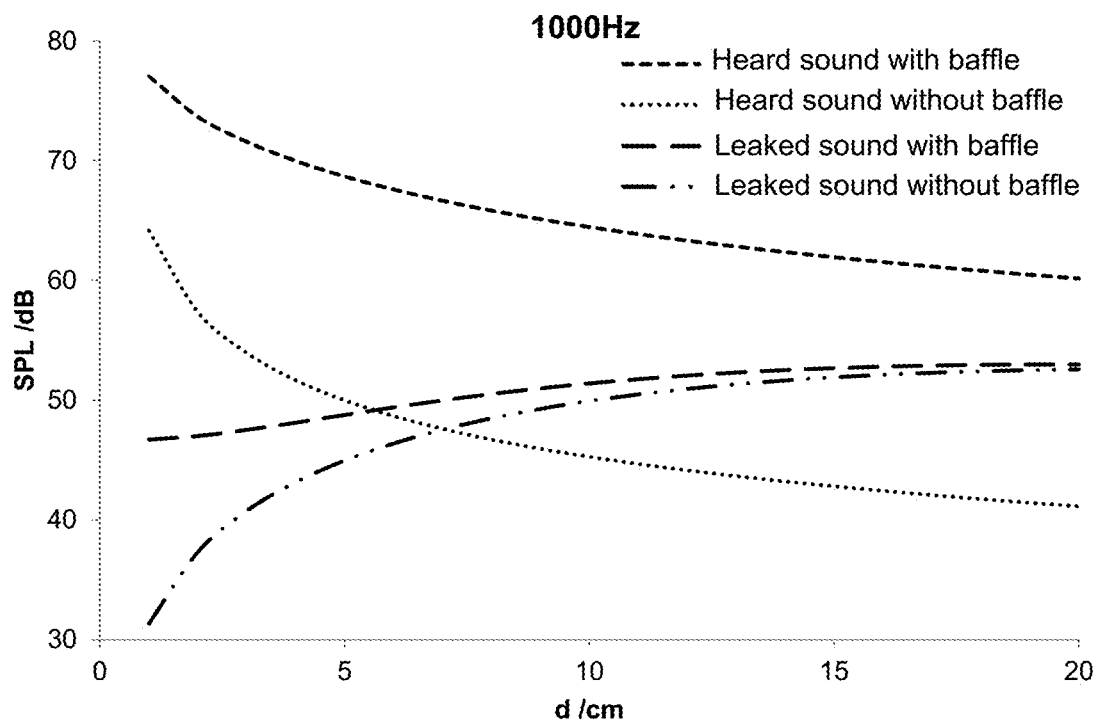
FIG. 10 is a graph illustrating sound pressure amplitude curves of two point sources with different distances at a frequency of 1000 Hz according to some embodiments of the present disclosure.

FIG. 9 is a graph illustrating sound pressure amplitude curves of two point sources with different distances at a frequency of 300 Hz according to some embodiments of the present disclosure. FIG. 10 is a graph illustrating sound pressure amplitude curves of two point sources with different distances at a frequency of 1000 Hz according to some embodiments of the present disclosure. As shown in FIG. 9 and FIG. 10, in the near field, when the frequency is 300 Hz or 1000 Hz, as the distance d between the two point sources increases, the volume of the sound heard by the user with a baffle between the two point sources may be greater than that without a baffle between the two point sources, which may show that at this frequency, a baffle between the two point sources may effectively increase the volume of the sound heard by the user in the near field. In the far field, the volume of the leaked sound with a baffle between the two point sources may be equivalent to that without a baffle between the two point sources, which may show that at this frequency, whether a baffle is arranged between the two point sources has little effect on the far-field sound leakage.

Figure 11:
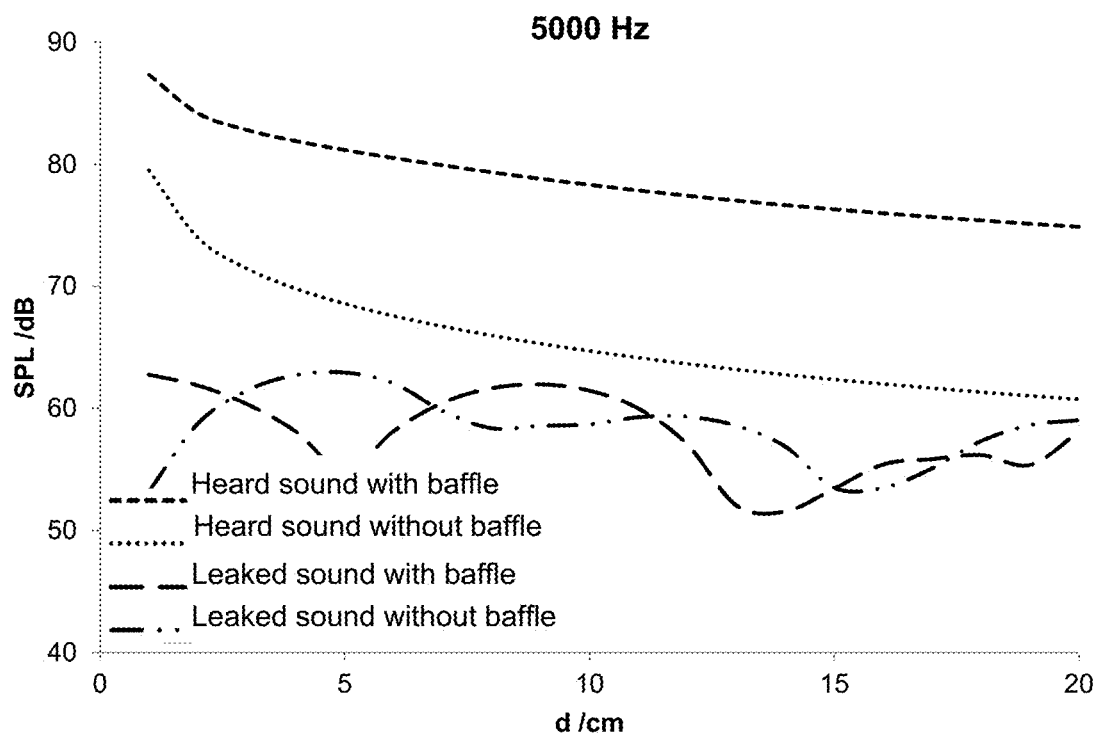
FIG. 11 is a graph illustrating sound pressure amplitude curves of two point sources with different distances at a frequency of 5000 Hz according to some embodiments of the present disclosure.

FIG. 11 is a graph illustrating sound pressure amplitude curves of two point sources with different distances at a frequency of 5000 Hz according to some embodiments of the present disclosure. As shown in FIG. 11, in the near field, when the frequency is 5000 Hz, as the distance d between the two point sources increases, the volume of the sound heard by the user with a baffle between the two point sources may be always greater than that without a baffle between the two point sources. In the far field, the volume of the leaked sound of the two point sources with and without a baffle may be fluctuant along with the distance d, but overall, whether the baffle structure is arranged between the two point sources may have little effect on the far-field sound leakage.

In some embodiments, in order to keep the sound output by the acoustic output apparatus as loud as possible in the near field while suppressing the sound leakage in the far field, the distance d between the two sound guiding holes may be set to be less than or equal to 20 cm. Preferably, the distance d between the two sound guiding holes may be set to be less than or equal to 12 cm. More preferably, the distance d between the two sound guiding holes may be set to be less than or equal to 10 cm. More preferably, the distance d between the two sound guiding holes may be set to be less than or equal to 6 cm.

It should be noted that the above descriptions are merely for the convenience of description, and not intended to limit the present disclosure. It may be understood that, for those skilled in the art, after understanding the principle of the present disclosure, various modifications and changes in the forms and details of the acoustic output apparatus may be made without departing from this principle. For example, in some embodiments, a count of sound guiding holes on both sides of the baffle may not be limited to one, a plurality of sound guiding holes may be set on both sides of the baffle. The count of the sound guiding holes may be the same or different. For example, a count of sound guiding holes on one side of the baffle may be two, and a count of sound guiding holes on the other side may be two or three. These changes are all within the protection scope of the present disclosure.

Figure 12:
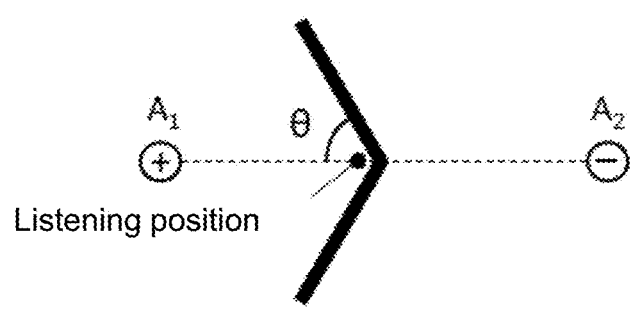
FIG. 12 is a schematic diagram illustrating two point sources with baffles with different included angles according to some embodiments of the present disclosure.

An included angle formed by the baffle and the connection line between the two point sources or the connection line between the two sound guiding holes may affect the volume of the near-field sound and the far-field leakage of the acoustic output apparatus. In order to further explain the influence of the included angle formed by the baffle and the connection line between the two point sources or the connection line between the two sound guiding holes on the sound output effect, a volume of the near-field sound at the listening position or/and a volume of the far-field leakage under different conditions may specifically be described below. FIG. 12 is a schematic diagram illustrating two point sources with baffles with different included angles according to some embodiments of the present disclosure. For illustration purposes, as shown in FIG. 12, the baffle may be a V-shaped plate structure. The baffle may be located between the point source $A_1$ and the point source $A_2$. A total length of the baffle may be equal to a distance d between the two point sources (e.g., the point source $A_1$ and the point source $A_2$). An intersection of the baffle and the connection line between the two point sources may be located at a central point of the two point sources. In some embodiments, an included angle θ formed by the baffle and the connection line between the two point sources (e.g., point source $A_1$, point source $A_2$) may vary from 15 degrees to 165 degrees. It should be noted that the listening position, the structure of the baffle, and the included angle formed by the baffle and the connection line between the two point sources in the above embodiments may merely serve as an exemplary illustration of the principle and effect in the present disclosure, which may not be limited herein. The listening position may be adjusted according to the actual conditions. For example, the listening position may also be located at other positions between the point source $A_1$ or the point source $A_2$ and the central point of the two point sources. In some embodiments, the listening position may not be located on the connection line between the two point sources. A shape, position, and length of the baffle may be adjusted according to the actual conditions. For example, the shape of the baffle may not be limited to the V-shape. More descriptions of the shape of the baffle may be found elsewhere in the present disclosure, for example, FIG. 37 and the descriptions thereof. As another example, the length of the baffle may be longer or shorter than the distance d between the two point sources. For a further example, the baffle may cross the connection line between the two point sources, or be located on one side of the connection line between the two point sources. In some embodiments, the baffle may have a regular or irregular shape. The included angle formed by the baffle and the connection line between the two point sources may refer to an angle between a line or plane where the baffle is located and the connection line between the two point sources or an angle between a characteristic line (for example, a side of the baffle) or surface (for example, a side surface of the baffle) on the baffle and the connection line between the two point sources.

Figure 13:
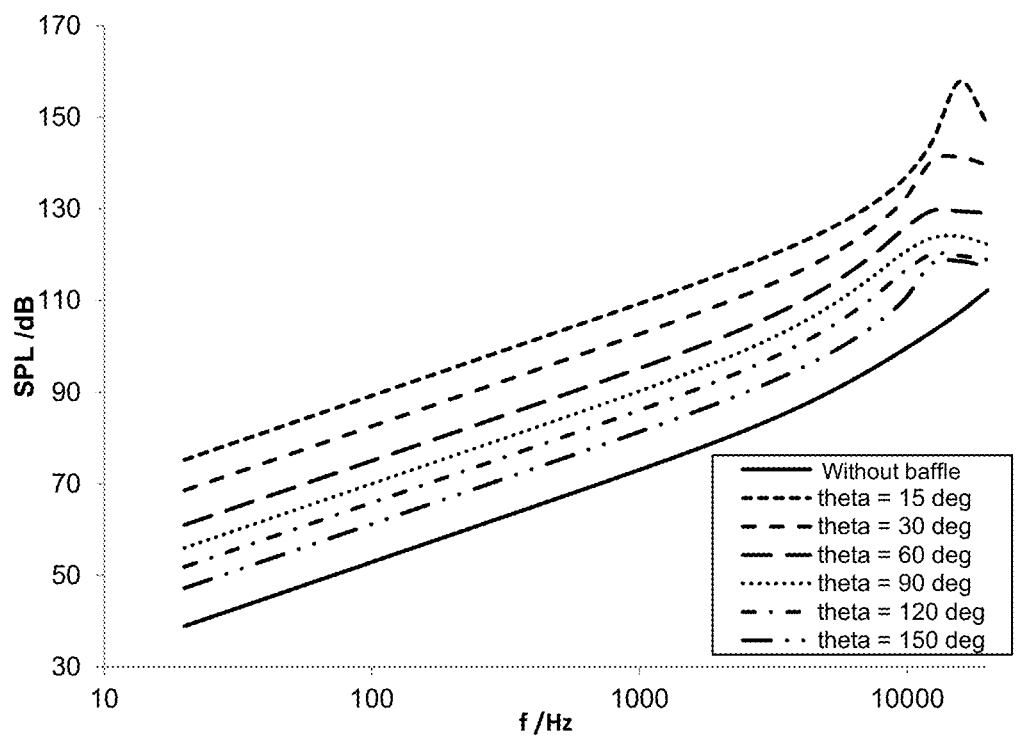
FIG. 13 is a graph illustrating near-field frequency response curves of two point sources with baffles having different included angles according to some embodiments in FIG. 12.
Figure 14:
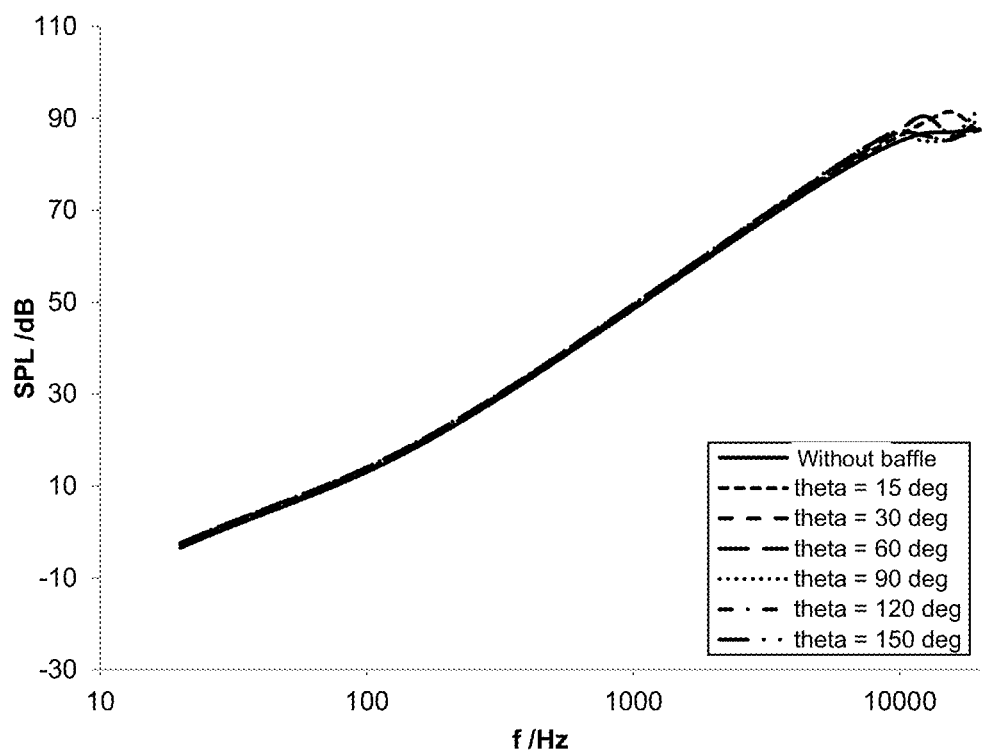
FIG. 14 is a graph illustrating far-field frequency response curves of two point sources with baffles having different included angles according to some embodiments in FIG. 12.
Figure 15:
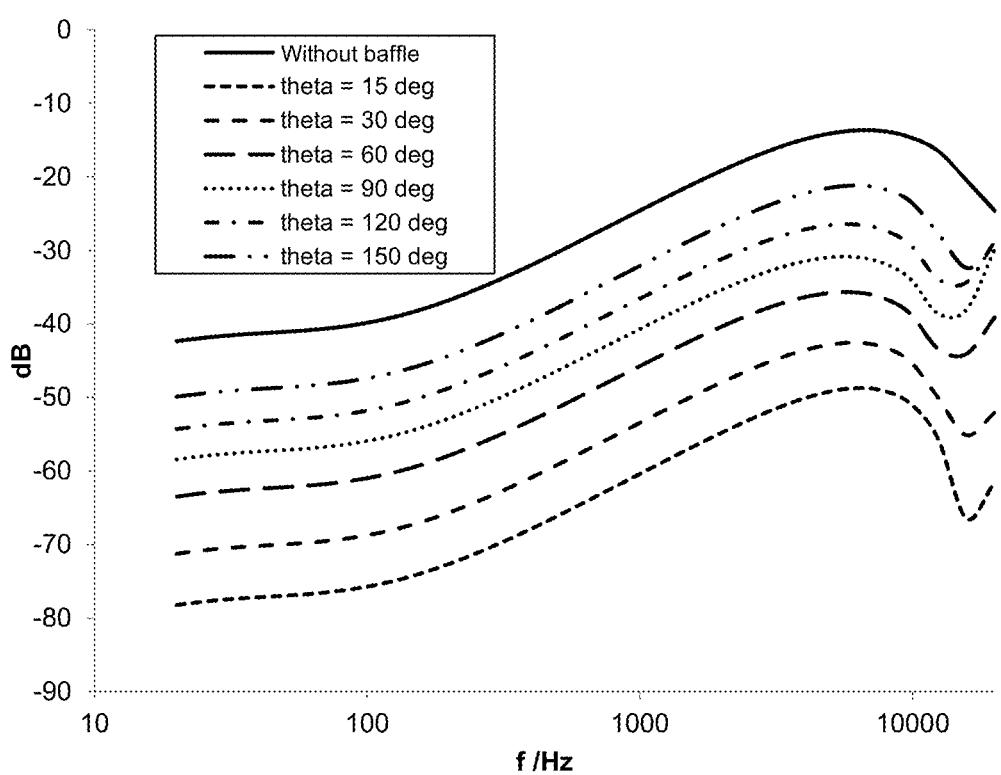
FIG. 15 is a graph illustrating sound leakage indexes generated according to some embodiments in FIG. 12 and FIG. 13.

FIG. 13 is a graph illustrating near-field frequency response curves of two point sources with baffles having different included angles according to some embodiments in FIG. 12. As shown in FIG. 13, at the listening position in the near field, a volume of the near-field sound when the baffle and the connection line between the two point sources form an arbitrary angle θ (that is, "theta" shown in FIG. 13) may be larger than a volume of the near-field sound when no baffle is set between the two sound guiding holes (that is, the "without baffle" shown in FIG. 13). It may be concluded that the setting of the baffle between the two point sources may effectively increase the volume of the near-field sound. Further, the volume of the sound heard by the user may change significantly with the change of the included angle θ. Within a certain range, the smaller the included angle θ is, the larger the volume at the listening position may be. As used herein, the certain range may be less than 150 degrees. Preferably, the certain range may be less than 120 degrees. More preferably, the certain range may be less than 90 degrees. FIG. 14 is a graph illustrating far-field frequency response curves of two point sources with baffles having different included angles according to some embodiments in FIG. 12. As shown in FIG. 14, it may be seen that the included angle formed by the baffle and the connection line between the two point sources has little effect on the far-field sound leakage. FIG. 15 is a graph illustrating sound leakage indexes generated according to some embodiments in FIG. 12 and FIG. 13. As shown in FIG. 15, the sound leakage indexes when the baffle and the connection line between the two point sources form the arbitrary angle θ may be smaller than sound leakage indexes when no baffle is set between the two point sources. It may be concluded that the setting of the baffle between the two point sources may effectively reduce the sound leakage indexes of the two point sources. Further, the sound leakage indexes may change significantly with the change of a spatial position relationship (for example, the included angle θ) between the baffle and the two point sources. Within a certain range, the smaller the included angle θ is, the smaller the sound leakage indexes may be, that is, the stronger the ability to reduce the sound leakage of the two point sources may be. In some embodiments, the baffle may be set between the two point sources and the included angle formed by the baffle and the connection line between the two point sources may be designed reasonably, so that the acoustic output apparatus may have a strong ability to reduce the sound leakage. In some embodiments of the present disclosure, the included angle may refer to an angle between a vector pointing from the intersection of the baffle and the connection line between the two point sources to a point source closer to the listening position and a vector pointing to the exterior (for example, surrounding environment) along a line where the baffle is located. Preferably, the included angle formed by the baffle and the connection line between the two sound guiding holes may be less than 150 degrees. Preferably, the included angle formed by the baffle and the connection line between the two sound guiding holes may be less than 120 degrees. Preferably, the included angle formed by the baffle and the connection line between the two sound guiding holes may be less than or equal to 90 degrees. Preferably, the included angle formed by the baffle and the connection line between the two sound guiding holes may be less than or equal to 60 degrees. More preferably, the included angle formed by the baffle and the connection line between the two sound guiding holes may be less than or equal to 30 degrees.

Figure 16:
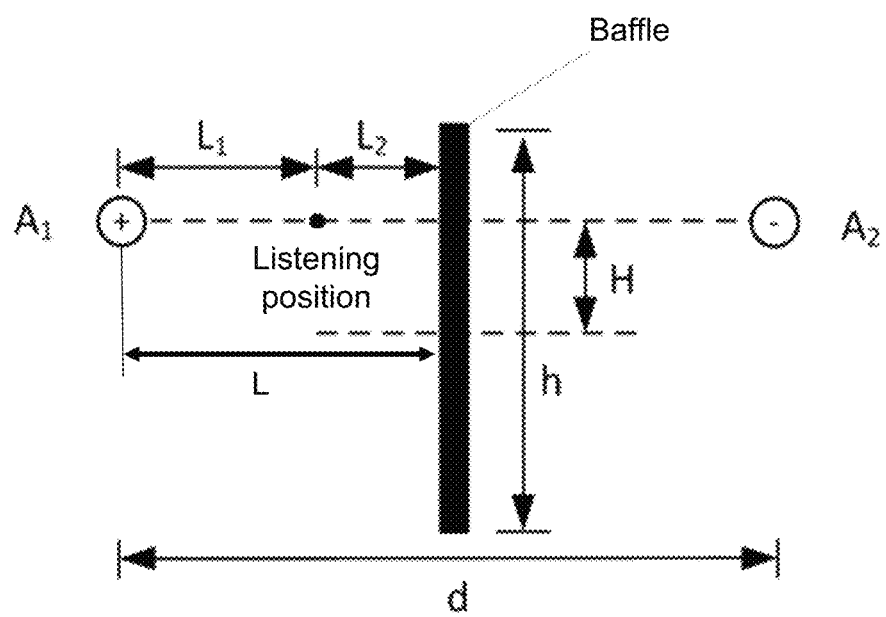
FIG. 16 is a diagram illustrating an exemplary distribution of two point sources and a baffle according to some embodiments of the present disclosure.

In some embodiments, a size of the baffle may affect the sound output effect of the two point sources. FIG. 16 is a diagram illustrating an exemplary distribution of two point sources and a baffle according to some embodiments of the present disclosure. Merely by way of example, as shown in FIG. 16, a baffle may be set in the center between the point source $A_1$ and the point source $A_2$. The listening position (for example, the user's ear hole) may be located on the connection line between the point source $A_1$ and the point source $A_2$, and the listening position may be between the point source $A_1$ and the baffle. A distance between the point source $A_1$ and the baffle may be L. A distance between the point source $A_1$ and the point source $A_2$ may be d. A distance between the point source $A_1$ and the listening position may be $L_1$, and a distance between the listening position and the baffle may be $L_2$. A height of the baffle in a direction perpendicular to the connection line between the two point sources may be h. A distance from a center of the baffle to the connection line between the two point sources may be H. When the distance d between the two point sources remains unchanged, the height h of the baffle may be changed, such that the height h of the baffle and the distance d between the two point sources have a different proportional relationship. A volume of the sound heard by the user at the listening position and a volume of the far-field leakage under the different proportional relationships may be obtained.

Figure 17:
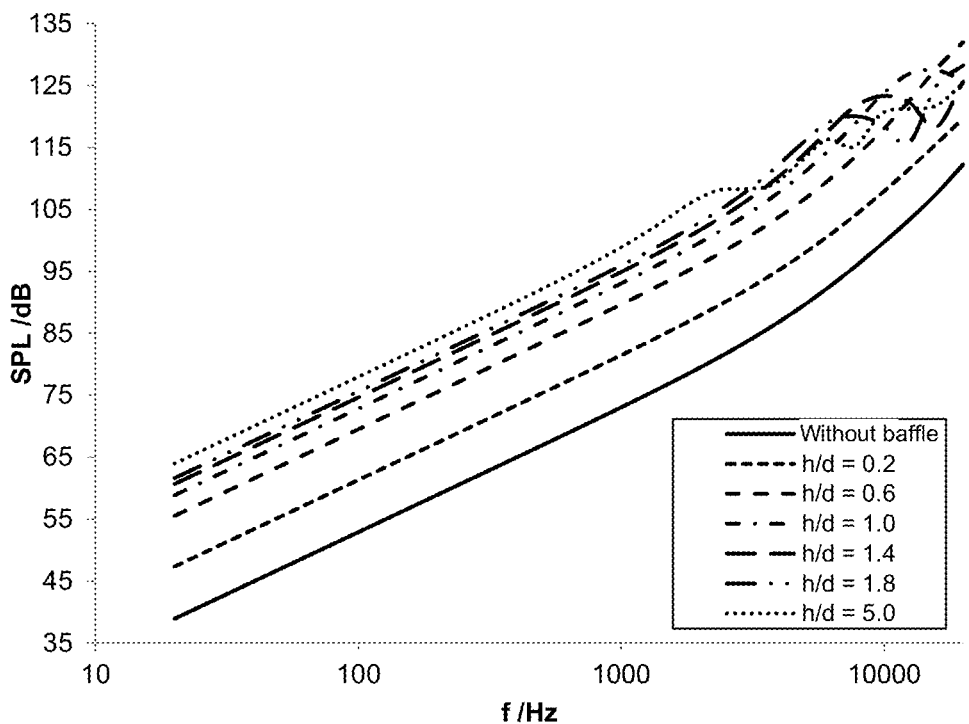
FIG. 17 is a graph illustrating near-field frequency response curves of two point sources without a baffle or with baffles of different heights according to some embodiments in FIG. 16.

FIG. 17 is a graph illustrating near-field frequency response curves of two point sources without a baffle or with baffles of different heights according to some embodiments in FIG. 16. As shown in FIG. 17, at the listening position in the near field, a volume of the near-field sound when baffles of different heights (that is, "h/d" shown in FIG. 17) are set between the two point sources may be greater than a volume of the near-field sound when no baffle (that is, "without baffle" shown in FIG. 17) between the two sound guiding holes. Further, as the height of the baffle increases, that is, a ratio of the height of the baffle to the distance between the two point sources increases, the volume provided by the two point sources at the listening position (i.e., the near-field sound) may gradually increase. It may be concluded that an appropriate increase in the height of the baffle may effectively increase the volume at the listening position.

Figure 18:
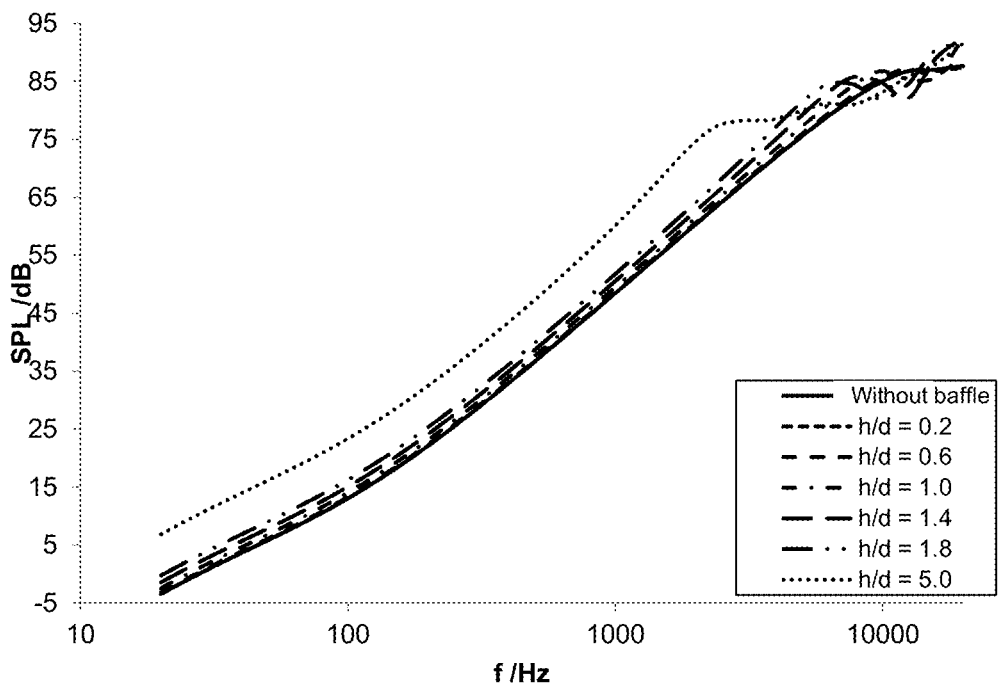
FIG. 18 is a graph illustrating far-field frequency response curves of two point sources without a baffle or with baffles of different heights according to some embodiments in FIG. 16.

FIG. 18 is a graph illustrating far-field frequency response curves of two point sources without a baffle or with baffles of different heights according to some embodiments in FIG. 16. As shown in FIG. 18, in the far field (for example, positions in the environmental far away from the user's ear), when the ratio h/d of the height of the baffle to the distance between the two point sources changes within a certain range (for example, as shown in FIG. 18, h/d is equal to 0.2, 0.6, 1.0, 1.4, 1.8), a volume of the leaked sound generated by the two point sources may be similar to a volume of the leaked sound generated by the two point sources without a baffle. When the ratio h/d of the height of the baffle to the distance between the two point sources increases to a certain amount (for example, h/d is equal to 5.0), the volume of the leaked sound generated by the two point sources at the far field may be larger than the volume of the leaked sound generated by the two point sources without a baffle. Therefore, in order to avoid a larger sound leakage in the far field, the size of the baffle between the two point sources should not be too large.

Figure 19:
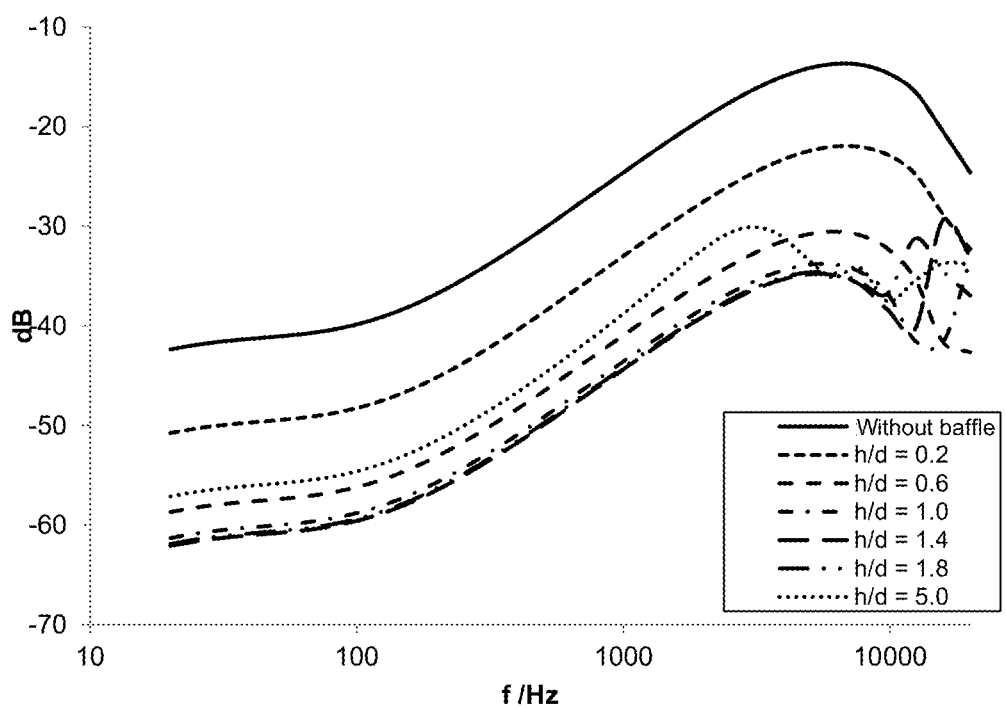
FIG. 19 is a graph illustrating sound leakage indexes of two point sources without a baffle or with baffles of different heights according to some embodiments in FIG. 16.

FIG. 19 is a graph illustrating sound leakage indexes of two point sources without a baffle or with baffles of different heights according to some embodiments in FIG. 16. As shown in FIG. 19, the sound leakage indexes when the baffles of different heights are set between the two point sources may be smaller than the sound leakage indexes when no baffle is set between the two point sources. Therefore, in some embodiments, in order to keep the sound output by the acoustic output apparatus as loud as possible in the near field and suppress the sound leakage in the far field, a baffle may be set between the two sound guiding holes, and a ratio of the height of the baffle to the distance between the two sound guiding holes may be less than or equal to 5. Preferably, the ratio of the height of the baffle to the distance between the two sound guiding holes may be less than or equal to 3. More preferably, the ratio of the height of the baffle to the distance between the two sound guiding holes may be less than or equal to 2. More preferably, the ratio of the height of the baffle to the distance between the two sound guiding holes may be less than or equal to 1.8.

Figure 20:
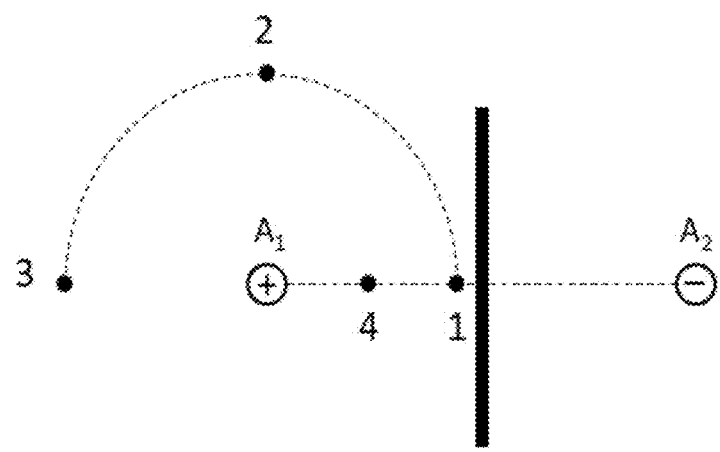
FIG. 20 is a graph illustrating exemplary distributions of different listening positions according to some embodiments of the present disclosure.

In some embodiments, under the premise of maintaining the distance between the two point sources and the height of the baffle, a position of the listening position and/or the baffle relative to the position of the two point sources may have a certain effect on the volume of the near-field sound and the volume of the far-field leakage. In order to improve the output effect of the acoustic output apparatus, in some embodiments, the acoustic output apparatus may include two sound guiding holes. The two sound guiding holes may be respectively located on both sides of the listening position, and the baffle may be located at one side of the listening position. The distance from one sound guiding hole on a same side of the baffle as the listening position of the two sound guiding holes to the listening position may be shorter than the distance from the other sound guiding hole to the listening position. In order to further illustrate the effect of the listening position on the sound output effect, as an exemplary illustration, as shown in FIG. 20, four representative listening positions (a listening position 1, a listening position 2, a listening position 3, a listening position 4) may be selected to illustrate the effect and principle of listening position selection. The listening position 1, the listening position 2, and the listening position 3 may have an equal distance from the point source $A_1$, which may be $r_1$. The distance between the listening position 4 and the point source $A_1$ may be $r_2$, and $r_2 < r_1$. The point source A1 and the point source A2 may generate sounds with opposite phases, respectively.

Figure 21:
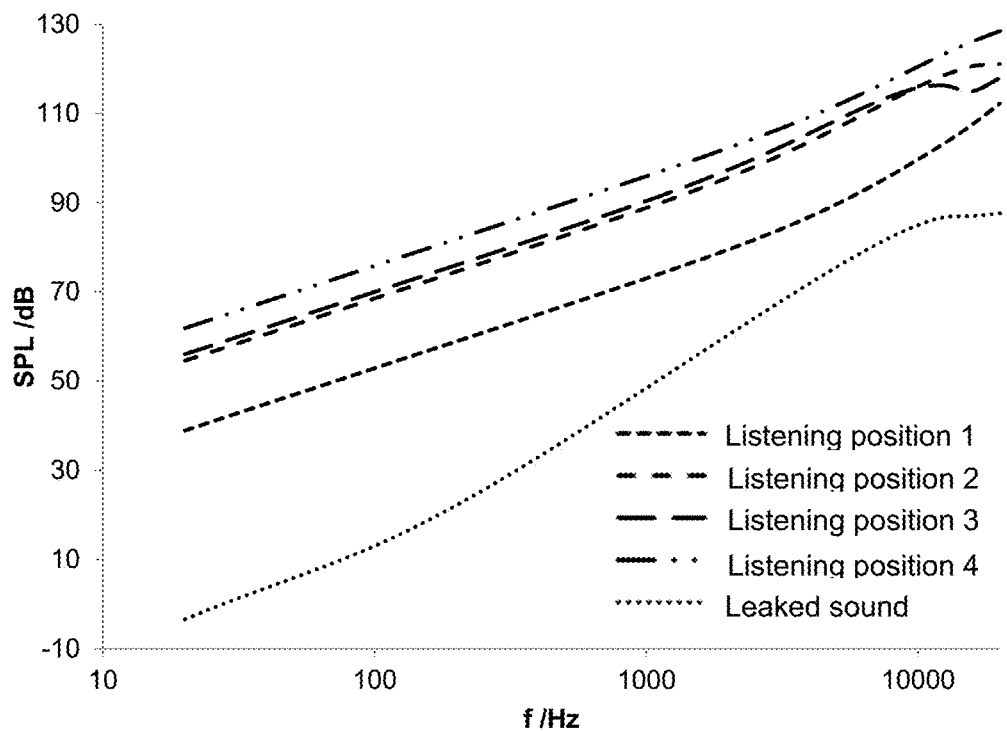
FIG. 21 is a graph illustrating near-field frequency response curves of two point sources without a baffle at different listening positions according to some embodiments of the present disclosure.
Figure 22:
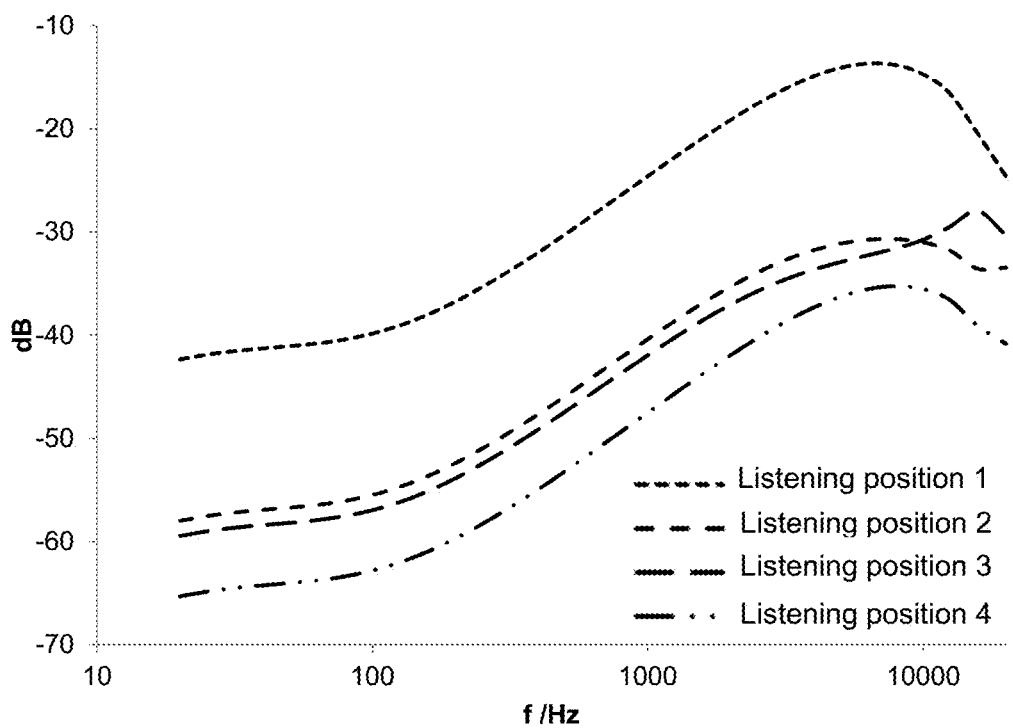
FIG. 22 is a graph illustrating sound leakage indexes of two point sources without a baffle at different listening positions according to some embodiments of the present disclosure.

FIG. 21 is a graph illustrating near-field frequency response curves of two point sources without a baffle at different listening positions according to some embodiments of the present disclosure. FIG. 22 is a graph illustrating sound leakage indexes at different listening positions obtained based on Equation (4) on the basis of FIG. 21. As shown in FIG. 21 and FIG. 22, for the listening position 1, in the case without a baffle, since the acoustic route difference between the point source $A_1$ and the point source $A_2$ to the listening position 1 is small, the difference in amplitude of the sound generated by the two point sources at the listening position 1 may be small, so that interference of the sounds of two point sources at the listening position 1 may cause the volume of the sound heard by the user to be smaller than that of other listening positions. For the listening position 2, compared with the listening position 1, the distance between the listening position 2 and the point source $A_1$ may remain unchanged, that is, the acoustic route from the point source $A_1$ to the listening position 2 may not change. However, the distance between the listening position 2 and the point source $A_2$ may be longer, and the acoustic route between the point source $A_2$ and the listening position 2 may increase. The amplitude difference between the sound generated by the point source $A_1$ and the point source $A_2$ at the listening position 2 may increase, so the volume of the sound transmitted from the two point sources after interference at listening position 2 may be greater than that at the listening position 1. Among all positions on an arc with a radius of $r_1$, since the acoustic route difference between the point source $A_1$ and the point source $A_2$ to the listening position 3 may be the longest, compared with the listening position 1 and the listening position 2, the listening position 3 may have the highest volume of the sound heard by the user. For the listening position 4, the distance between the listening position 4 and the point source $A_1$ may be short. The sound amplitude of the point source $A_1$ at the listening position 4 may be relatively large, the volume of the sound heard by the user at the listening position 4 may be relatively large. In summary, the volume of the sound heard by the user at the near-field listening position may change with the listening position and the relative position of the two point sources. When the listening position is on the connection line between two point sources and on the same side of the two point sources (for example, listening position 3), the acoustic route difference between the two point sources at the listening position may be the largest (the acoustic route difference may be the distance d between the two point sources). In this case, the volume of the sound heard by the user at this listening position may be greater than that at other positions. According to Equation (4), when the far-field sound leakage is constant, the sound leakage index corresponding to the listening position may be the smallest, and the leakage reduction capability may be the strongest. At the same time, reducing the distance $r_1$ between the listening position (for example, listening position 4) and the point source $A_1$ may further increase the volume at the listening position, reduce the sound leakage index, and improve the capability to reduce leakage.

Figure 23:
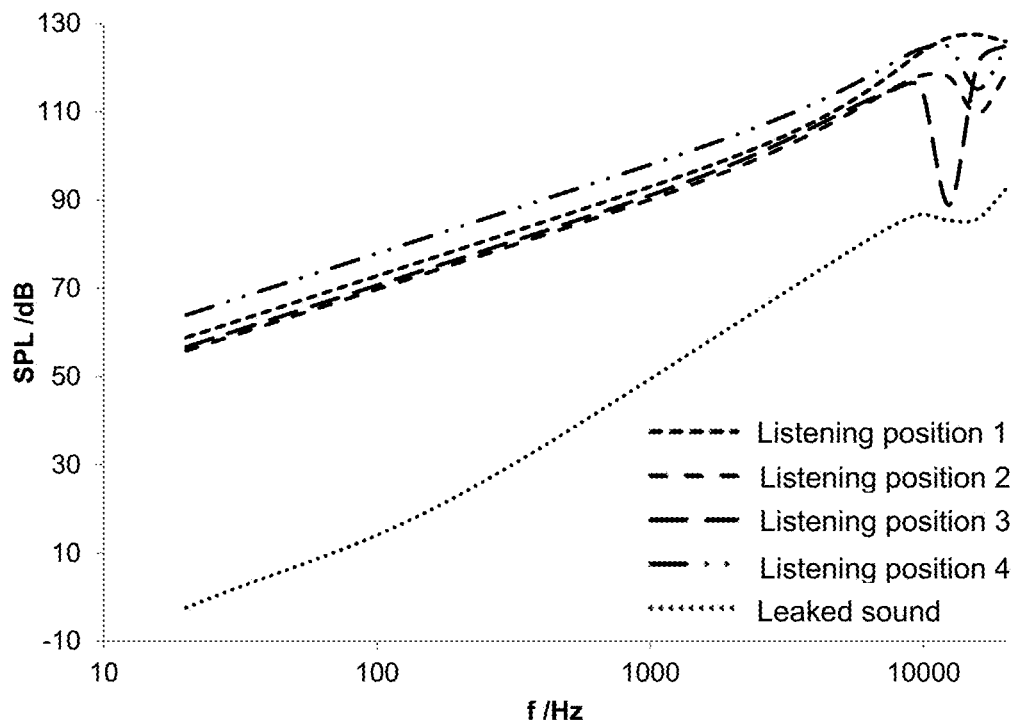
FIG. 23 is a graph illustrating near-field frequency response curves of two point sources with a baffle at different listening positions according to some embodiments of the present disclosure.
Figure 24:
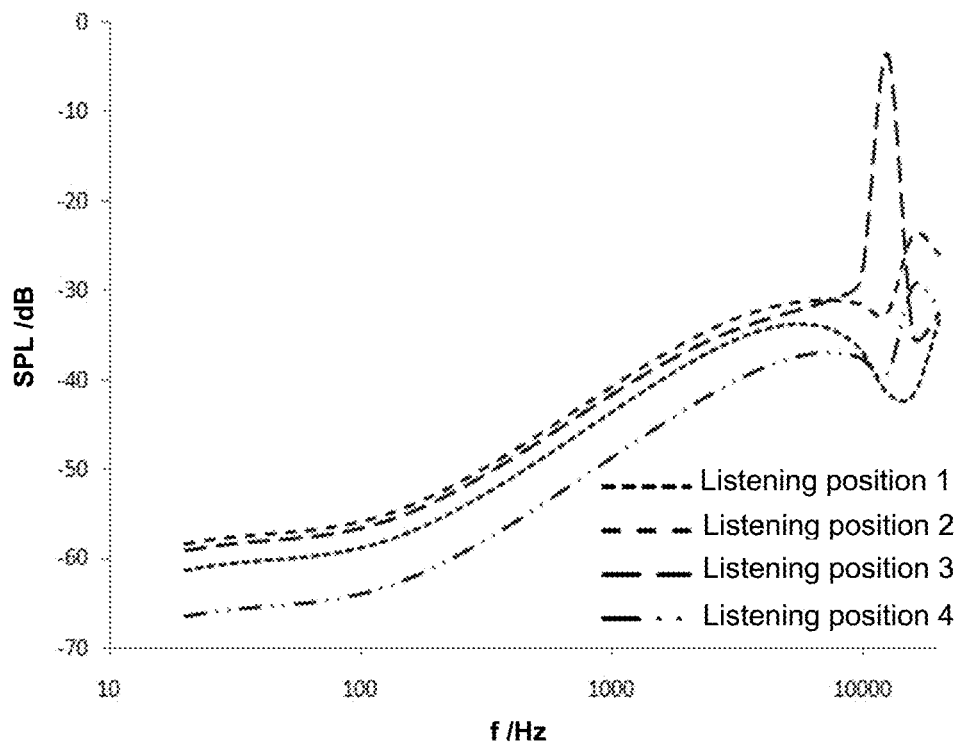
FIG. 24 is a graph illustrating sound leakage indexes of two point sources with a baffle at different listening positions according to some embodiments of the present disclosure.

FIG. 23 is a graph illustrating near-field frequency response curves of two point sources with a baffle (as shown in FIG. 20) at different listening positions according to some embodiments of the present disclosure. FIG. 24 is a graph illustrating=sound leakage indexes at different listening positions obtained based on Equation (4) on the basis of FIG. 23. As shown in FIG. 23 and FIG. 24, compared to the case without a baffle, the volume of the sound heard by the user generated by the two point sources at listening position 1 may significantly increase when there is a baffle. The volume of the sound heard by the user at listening position 1 may exceed that at the listening position 2 and the listening position 3. The reason may be that the acoustic route from the point source $A_2$ to the listening position 1 may increase after x a baffle is set between the two point sources. As a result, the acoustic route difference between the two point sources at the listening position 1 may increase significantly. The amplitude difference between the sounds generated by the two point sources at listening position 1 may increase, reducing the interference and cancellation of sounds, thereby increasing the volume of the sound heard by the user generated at the listening position 1 significantly. At the listening position 4, since the distance between the listening position and the point source $A_1$ is further reduced, the sound amplitude of the point source $A_1$ at this position may be larger, so the volume of the heard at the listening position 4 may be still the largest among the four listening positions. For the listening position 2 and the listening position 3, since the increase effect of the baffle on the acoustic route from the point source $A_2$ to the two listening positions is not very obvious, the volume increase effect at the listening position 2 and the listening position 3 may be less than that at the listening position 1 and the listening position 4 that are closer to the baffle.

The volume of the leaked sound in the far field may not change with listening positions, and the volume of the sound heard by the user at the listening position in the near field may change with listening positions. In this case, according to Equation (4), the leakage index of the acoustic output apparatus may vary in different listening positions. A listening position with a large volume of the sound heard by the user (for example, listening position 1 and listening position 4) may have a small sound leakage index, and a strong capability to reduce leakage. A listening position with a low volume of the sound heard by the user (for example, listening position 2 and listening position 3), may have a large sound leakage index, and a weak capability to reduce leakage.

In some embodiments, by designing the position of the baffle on the acoustic output apparatus, a distance from a sound guiding hole located on the same side of the baffle as the listening position (for example, the user's ear hole) to the listening position may be less than a distance from a sound guiding hole located on the other side of the baffle to the listening position. In such cases, since the sound guiding hole located on the same side of the baffle as the listening position is close to the listening position, an amplitude of a sound output by the sound guiding hole located on the same side of the baffle as the listening position may be large at the listening position, and an amplitude of a sound output by the sound guiding hole located on the other side of the baffle may be small at the listening position, which reduce the interference and cancellation of the sounds output by two sound guiding holes at the listening position, thereby ensuring that the volume of the sound heard by the user at the listening position is large.

In some embodiments, when the distance from one of the two sound guiding holes to the baffle is much less than the distance from the other of the two sound guiding holes to the baffle, the acoustic output apparatus may have a large volume at the listening position in the near field. In some embodiments, a ratio of the distance from one of the two sound guiding holes to the baffle to the distance from the other of the two sound guiding holes to the baffle may be less than or equal to ⅓. Preferably, the ratio of the distance from one of the two sound guiding holes to the baffle to the distance from the other of the two sound guiding holes to the baffle may be less than or equal to ¼. More preferably, the ratio of the distance from one of the two sound guiding holes to the baffle to the distance from the other of the two sound guiding holes to the baffle may be less than or equal to ⅙. More preferably, the ratio of the distance from one of the two sound guiding holes to the baffle to the distance from the other of the two sound guiding holes to the baffle may be less than or equal to 1/10.

Figure 25A:
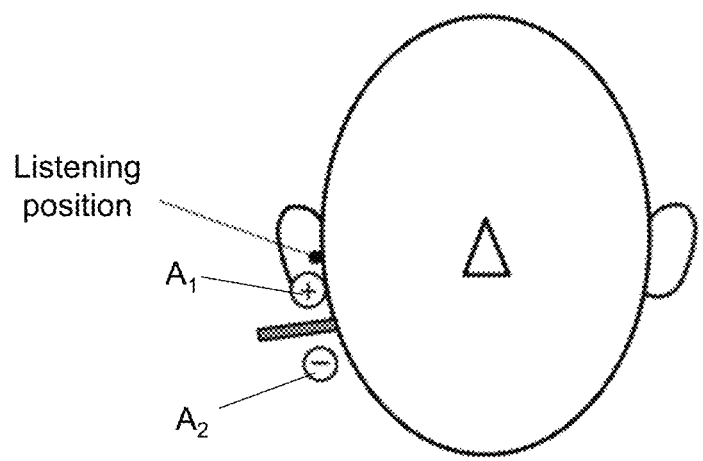
FIG. 25A is a schematic diagram illustrating two point sources and a listening position according to some embodiments of the present disclosure.
Figure 25B:
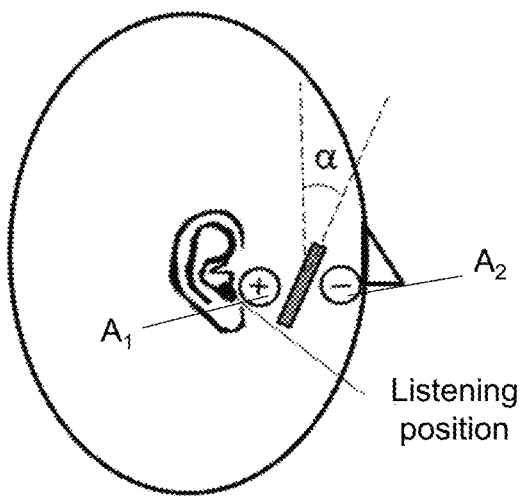
FIG. 25B is a schematic diagram illustrating two point sources and a listening position according to some embodiments of the present disclosure.

In some embodiments, the two sound guiding holes of the acoustic output apparatus may be located on the same side of the listening position. Merely by way of example, as shown in FIG. 25A, the two sound guiding holes (for example, a point source $A_1$ and a point source $A_2$) of the acoustic output apparatus may be located below the listening position (for example, the ear hole of the user). As another example, as shown in FIG. 25B, the two sound guiding holes of the acoustic output apparatus may be located in front of the listening position. It should be noted that the two sound guiding holes of the acoustic output apparatus are not limited to be located below and in front of the listening position. The two sound guiding holes may also be located above the listening position. In other embodiments, the two sound guiding holes of the acoustic output apparatus may not be limited to being set vertically shown in FIG. 25A and horizontally shown in FIG. 25B. The two sound guiding holes of the acoustic output apparatus may also be set obliquely. In addition, the listening position may be located on the connection line between the two sound guiding holes or not on the connection line between the two sound guiding holes. For example, the listening position may be located on the upper, lower, left, or right side of the connection line between the two sound guiding holes.

When the two sound guiding holes of the acoustic output apparatus are located on one side of the listening position and the distance between the two sound guiding holes is constant, the sound guiding hole closer to the listening position may output sound with a larger amplitude at the listening position, and the sound guiding hole on the other side of the baffle may output sound with a smaller amplitude at the listening position, which may reduce the interference and cancellation of the sounds output by the two sound guiding holes, thereby ensuring that the volume of the sound heard by the user at the listening position is large. In some embodiments, a ratio of the distance between the sound guiding hole closer to the listening position and the listening position to the distance between the two sound guiding holes may be less than or equal to 3. Preferably, the ratio of the distance between the sound guiding hole closer to the listening position and the listening position to the distance between the two sound guiding holes may be less than or equal to 1. More preferably, the ratio of the distance between the sound guiding hole closer to the listening position and the listening position to the distance between the two sound guiding holes may be less than or equal to 0.9. More preferably, the ratio of the distance between the sound guiding hole closer to the listening position and the listening position to the distance between the two sound guiding holes may be less than or equal to 0.6. More preferably, the ratio of the distance between the sound guiding hole closer to the listening position and the listening position to the distance between the two sound guiding holes may be less than or equal to 0.3.

When the two sound guiding holes of the acoustic output apparatus are located on one side of the listening position and the distance between the two sound guiding holes is constant, the height of the baffle may affect the volume of the near-field sound and the volume of the far-field leakage of the acoustic output apparatus. In some embodiments, the height of the baffle may be less than or equal to the distance between the two sound guiding holes. In some embodiments, a ratio of the height of the baffle to the distance between the two sound guiding holes may be less than or equal to 2. Preferably, the ratio of the height of the baffle to the distance between the two sound guiding holes may be less than or equal to 1.4. More description of the relationship between the height of the baffle and the distance between the two point sources may be found elsewhere in the present disclosure, for example, FIG. 17, FIG. 18, FIG. 19, and the descriptions thereof.

When the listening position and the position of the two point sources are fixed, the distance between the center of the baffle and the connection line between the two point sources may affect the volume of the near-field sound and the volume of far-field leakage of the acoustic output apparatus. According to FIG. 16, the height of the baffle may be expressed as h, and the distance from the center of the baffle to the connection line between the two point sources may be expressed as H. When the distance d between the two point sources remains unchanged, the distance H from the center of the baffle to the connection line between the two point sources is changed, such that the distance H from the center of the baffle to the connection line between the two point sources and the height h of the baffle may have different proportional relationships. Further, volumes of sounds at the listening position and volumes of far-field leakage under the different proportional relationships may be obtained. In some embodiments, the center of the baffle may refer to a center of mass or a center of the shape of the baffle. It should be noted that the baffle is not limited to the baffle with the intersection of the baffle and the connection line between the two point sources as shown in FIG. 16. The baffle may also be located above or below the connection line between the two point sources as a whole.

Figure 26:
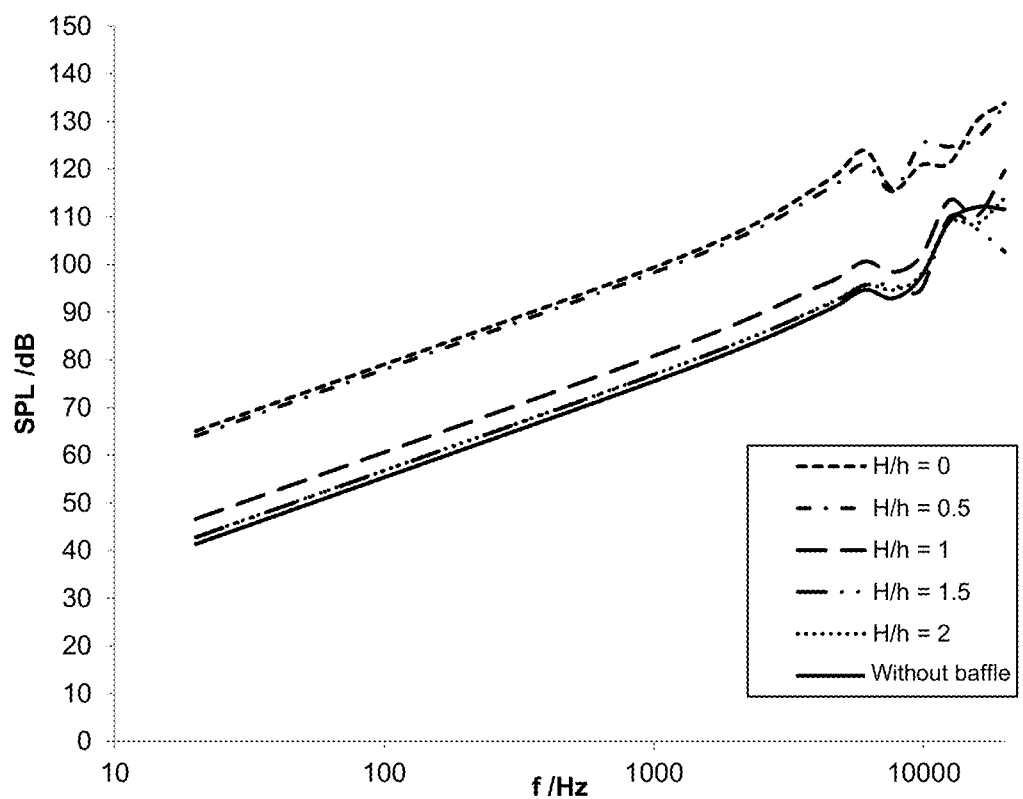
FIG. 26 is a graph illustrating near-field frequency response curves of two point sources with different ratios of a distance between a center of a baffle and a connection line between the two point sources to a height of the baffle according to some embodiments in FIG. 16.
Figure 27:
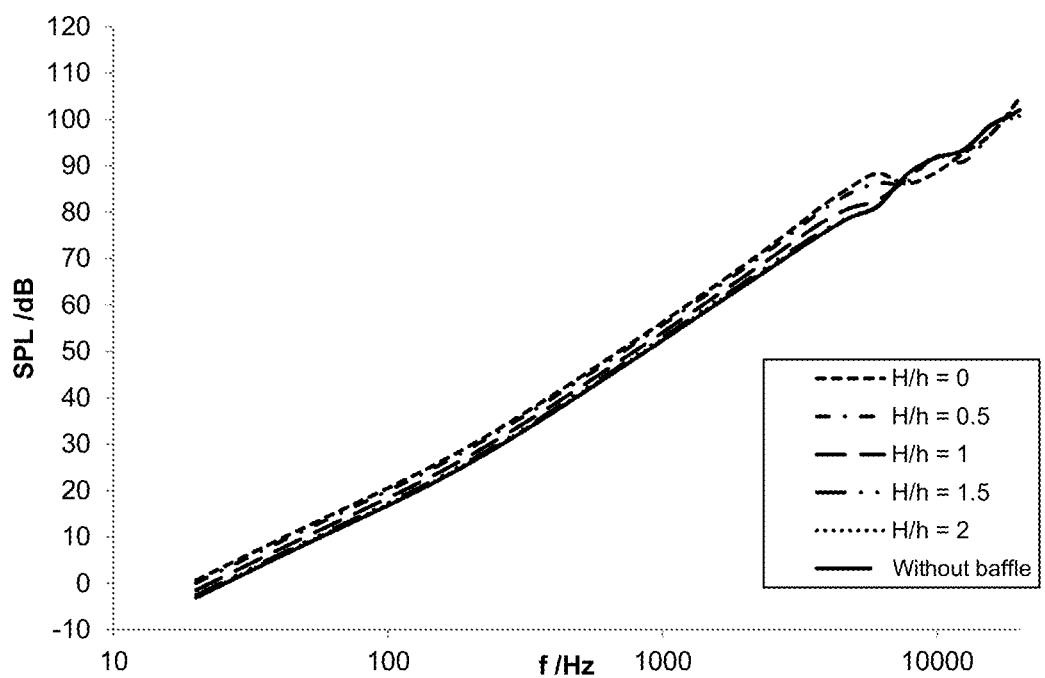
FIG. 27 is a graph illustrating far-field frequency response curves of two point sources with different ratios of a distance between a center of a baffle and a connection line between the two point sources to a height of the baffle according to some embodiments in FIG. 16.
Figure 28:
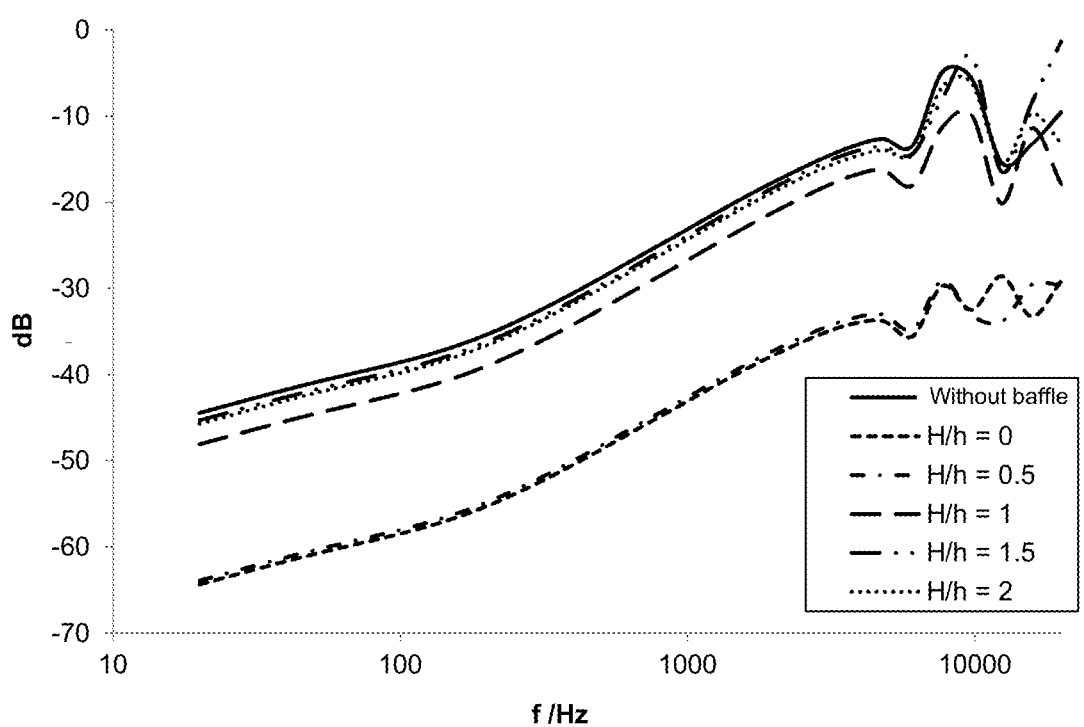
FIG. 28 is a graph illustrating sound leakage indexes of two point sources with different ratios of a distance between a center of a baffle and a connection line between the two point sources to a height of the baffle according to some embodiments in FIG. 16.

FIG. 26 is a graph illustrating near-field frequency response curves of two point sources with different ratios of a distance between a center of a baffle and a connection line between the two point sources to a height of the baffle according to some embodiments in FIG. 16. As shown in FIG. 26, the volume of sound at the listening position in the near field when the baffles with different positions are set between the two point sources (that is, "H/h" shown in FIG. 26) may be greater than that when no baffle is set between the two point sources (that is, "without baffle" in FIG. 26). Further, as the distance from the center of the baffle to the connection line between the two point sources gradually increases, the volume of sound at the listening position in the near field may gradually decrease. The reason may be that when the center of the baffle is far away from the connection line between the two point sources, the barrier effect of the baffle on the sounds from the two point sources to the listening position may be weakened. As a result, the degree of interference and cancellation of the sounds of the two point sources at the listening position may become larger, which results in a decrease in the volume of sound at the listening position. FIG. 27 is a graph illustrating far-field frequency response curves of two point sources with different ratios of a distance between a center of a baffle and a connection line between the two point sources to a height of the baffle according to some embodiments in FIG. 16. In the far field, the volume of the leaked sound when the baffles with different positions are set between the two point sources may be similar to that when no baffle is set between the two point sources. FIG. 28 is a graph illustrating sound leakage indexes of two point sources with different ratios of a distance between a center of a baffle and a connection line between the two point sources to a height of the baffle according to some embodiments in FIG. 16. As shown in FIG. 28, the sound leakage indexes when the baffles with different positions (that is, different "H/h" shown in FIG. 28)

are set between the two point sources may be less than that when no baffle (that is, "without baffle" shown in FIG. 28) is set between the two point sources, which may indicate that the ability to reduce the sound leakage is stronger when the baffles with different positions are set between the two point sources. Further, as the center of the baffle gradually approaches, that is, as the distance between the center of the baffle and the connection line between the two point sources gradually decreases, the sound leakage indexes gradually decrease, that is the ability to reduce the sound leakage is gradually enhanced. In some embodiments, in order to keep the sound output by the acoustic output apparatus as loud as possible in the near field and suppress the sound leakage in the far field, a ratio of the distance between the center of the baffle and the connection line between the two sound guiding holes to the height of the baffle may be less than or equal to 2. Preferably, the ratio of the distance between the center of the baffle and the connection line between the two sound guiding holes to the height of the baffle may be less than or equal to 1.5. More preferably, the ratio of the distance between the center of the baffle and the connection line between the two sound guiding holes to the height of the baffle may be less than or equal to 1. More preferably, the ratio of the distance between the center of the baffle and the connection line between the two sound guiding holes to the height of the baffle may be less than or equal to 0.5. More preferably, the ratio of the distance between the center of the baffle and the connection line between the two sound guiding holes to the height of the baffle may be less than or equal to 0.3.

Figure 29:
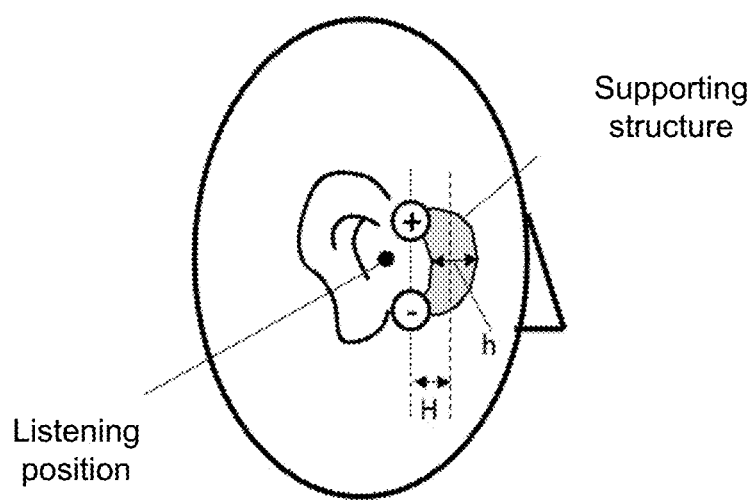
FIG. 29 is a schematic diagram illustrating a partial cross-section of an acoustic output apparatus according to some embodiments of the present disclosure.

In some embodiments, the supporting structure of the acoustic output apparatus may function as a baffle. For example, one of the two sound guiding holes may be provided on a side of the supporting structure facing the user's ear, and the opening direction of that sound guiding hole may be toward the user's ear. The other of the two sound guiding holes may be provided on a side of the supporting structure facing away from the user's ear, and the opening direction of that sound guiding hole may be facing away from the user's ear. In such cases, a distance from a structure center (e.g., a center of mass or a center of a shape of the supporting structure) of the supporting structure to the connection line between the two sound guiding holes may affect the volume of the near-field sound and the volume of the far-field leakage of the acoustic output apparatus. As used herein, the structure center of the supporting structure may refer to a center of the supporting structure in a direction perpendicular to the connection line between the two sound guiding holes. For the convenience of description, as shown in FIG. 29, the two sound guiding holes of the acoustic output apparatus may be located at two ends of the supporting structure ("+" may indicate the sound generated by the sound guiding hole facing away from the ear, and "−" may indicate the sound generated by the sound guiding hole facing towards the ear). The distance between the structural center of the supporting structure and the connection line between the two sound guiding holes may be expressed as H, and a height of the supporting structure may be expressed as h. In some embodiments, a ratio of the distance between the structural center of the supporting structure and the connection line between the two sound guiding holes to the height of the baffle (i.e., the supporting structure) may be less than or equal to 2. Preferably, the ratio of the distance between the structural center of the supporting structure and the connection line between the two sound guiding holes to the height of the baffle (i.e., the supporting structure) may be less than or equal to 1.5. More preferably, the ratio of the distance between the structural center of the supporting structure and the connection line between the two sound guiding holes to the height of the baffle (i.e., the supporting structure) may be less than or equal to 1. More preferably, the ratio of the distance between the structural center of the supporting structure and the connection line between the two sound guiding holes to the height of the baffle (i.e., the supporting structure) may be less than or equal to 0.5. More preferably, the ratio of the distance between the structural center of the supporting structure and the connection line between the two sound guiding holes to the height of the baffle (i.e., the supporting structure) may be less than or equal to 0.3.

It should be noted that the above descriptions are merely for the convenience of description, and not intended to limit the present disclosure. It may be understood that, for those skilled in the art, after understanding the principle of the present disclosure, various modifications and changes in the forms and details may be made to the above acoustic output apparatus without departing from this principle. In some embodiments, the two sound guiding holes of the acoustic output apparatus in FIG. 29 may be not limited to being set vertically shown in FIG. 29, and may also be set in other manners. For example, in some embodiments, the two sound guiding holes may also be set horizontally (for example, one of the two sound guiding holes may be located on a front side of the ear, and the other of the two sound guiding holes may be located on a back side of the ear) or obliquely. In some embodiments, the two sound guiding holes in FIG. 29 may be not limited to being located on both sides of the listening position, and may also be located on a same side of the listening position. For example, two sound guiding holes may be located above, below, or in front of the listening position. These changes are all within the protection scope of the present disclosure.

The material of the baffle may affect the volume of the near-field sound and the volume of the far-field leakage of the acoustic output apparatus. In some embodiments, the baffle may be made of acoustic resistance material that may suppress/absorb sound at a specific frequency. For example, if the volume of high-frequency sound in the near field is needed to be reduced, the interference and cancellation of high-frequency sounds in the near field may need to be promoted, that is, it may be necessary to make sounds with opposite phases output by the two sound guiding holes on both sides of the baffle reach the near-field position. Therefore, the baffle may be made of material that can block low-frequency sounds and allow high-frequency sounds to pass through, such that the baffle may be weak in blocking high-frequency sounds, and the high-frequency sounds output by the sound guiding holes on both sides of the baffle may have similar amplitude but opposite phases at the listening position. As a result, the high-frequency sounds may be suppressed due to the interference and cancellation of the high-frequency sounds at the listening position. The material that can block low-frequency sounds and allow high-frequency sounds to pass through may refer to a material that has a larger impedance to low-frequency sounds but a smaller impedance to high-frequency sounds. In some embodiments, the material that can block low-frequency sounds and allow high-frequency sounds to pass through may include resonance sound-absorbing materials, polymer particle sound-absorbing materials, or the like. As another example, in order to reduce a low-frequency sound in the near field, the baffle may be made of material that can block high-frequency sounds and allow low-frequency sounds to pass through, such that the baffle may be weak in blocking low-frequency sounds, and the low-frequency sounds output by the sound guiding holes on both sides of the baffle may have close amplitude but opposite phases at the listening position. As a result, the low-frequency sounds may be suppressed due to the interference and cancellation of the low-frequency sounds at the listening position. The material that can block high-frequency sounds and allow low-frequency sounds to pass through may refer to material that has a larger impedance to high-frequency sounds but a smaller impedance to low-frequency sounds. In some embodiments, the material that can block high-frequency sounds and allow low-frequency sounds to pass through may include porous sound-absorbing materials with a foam type or a fiber type. It should be known that the acoustic resistance material may be not limited to the material that can block low-frequency sounds and allow high-frequency to pass through and the material that can block high-frequency sounds and allow low-frequency to pass through. Different acoustic resistance materials may be used in the acoustic output apparatus according to the requirements of the acoustic output apparatus for the sound frequency band.

In order to further illustrate the effect of the acoustic resistance material of the baffle on the sound output effect of the acoustic output apparatus, the low-frequency acoustic resistance baffle (that is, a baffle made of material that has a large impedance to low-frequency sounds and a small impedance to high-frequency sounds) may be taken as an example to explain the volume of the near-field sound at the listening position or/and the volume of far-field leakage.

Figure 30:
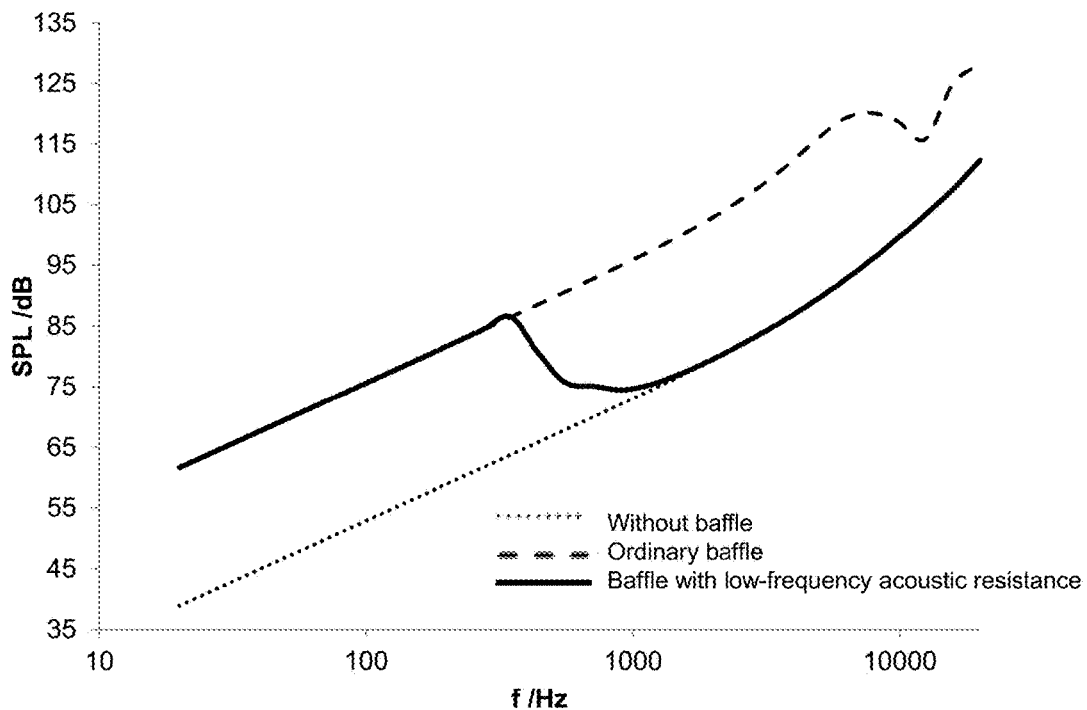
FIG. 30 is a graph illustrating near-field frequency response curves of two point sources when a baffle with a low-frequency acoustic resistance is set between the two point sources according to some embodiments of the present disclosure.

FIG. 30 is a graph illustrating near-field frequency response curves of two point sources when a baffle with a low-frequency acoustic resistance is set between the two point sources according to some embodiments of the present disclosure. As shown in FIG. 30, in the near field, in a certain frequency range (for example, 20-1000 Hz), the volume of the sound heard by the user when an ordinary baffle (that is, a baffle made of material that has a large impedance to low-frequency sounds and high-frequency sounds) or the baffle with the low-frequency acoustic resistance is set between the two point sources may be greater than the volume of the sound heard by the user when no baffle is set between the two point sources. When the frequency is greater than 1000 Hz, there may be little change in the volume of the sound heard by the user when the baffle with the low-frequency acoustic resistance and no baffle is set between the two point sources. The volume of the sound heard by the user when the ordinary baffle is set between the two point sources may be greater than the volume of the sound heard by the user when the baffle with the low-frequency acoustic resistance and no baffle is set between the two point sources. The reason may be that the baffle with the low-frequency acoustic resistance has a large acoustic resistance to low-frequency sounds. Further, when the sounds output by the two sound guiding holes of the acoustic output apparatus are low-frequency sounds, the baffle with the low-frequency acoustic resistance may serve as a baffle to reduce the interference and cancellation of the sounds output by the two sound guiding holes at the listening position, thereby ensuring that the volume of the sound heard by the user at the listening position is large. When the sounds output by the two sound guiding holes of the acoustic output apparatus are high-frequency sounds, the blocking effect of the baffle with the low-frequency acoustic resistance may be weakened, and the high-frequency sounds output by the two sound guiding holes may directly pass through the baffle with the low-frequency acoustic resistance to interfere and cancel at the listening position, thereby reducing the volume of the high-frequency sounds output by the acoustic output apparatus at the listening position.

Figure 31:
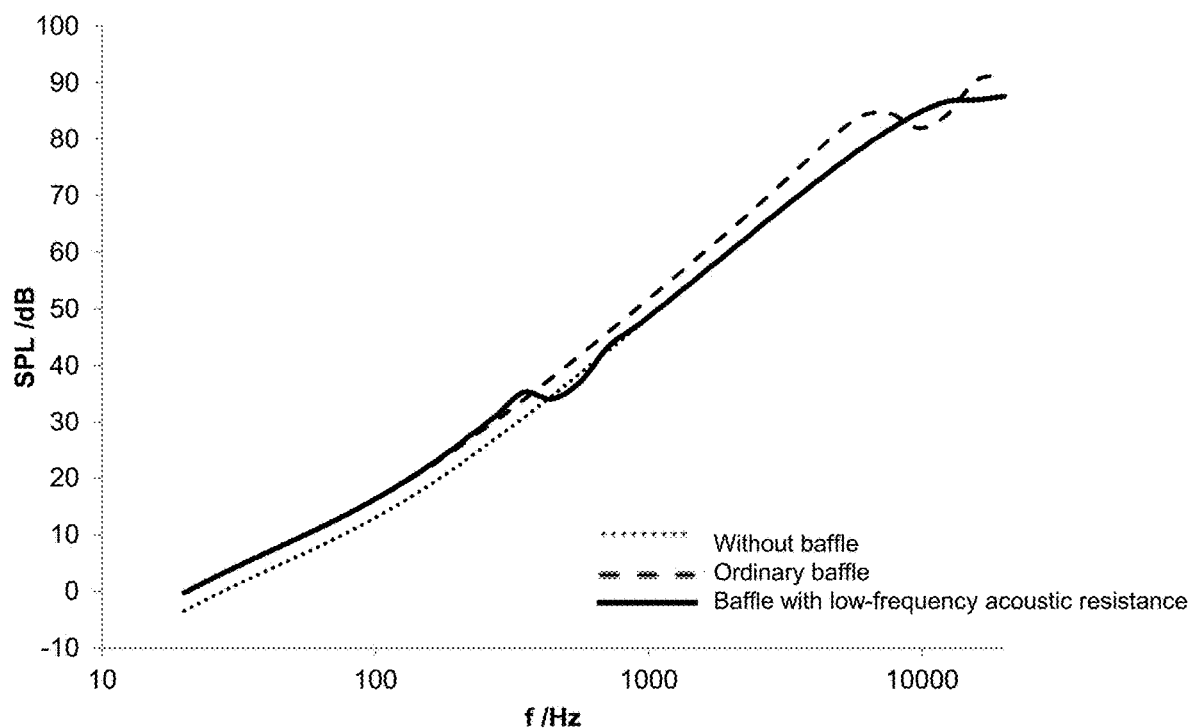
FIG. 31 is a graph illustrating far-field frequency response curves of two point sources when a baffle with a low-frequency acoustic resistance is set between the two point sources according to some embodiments of the present disclosure.

FIG. 31 is a graph illustrating far-field frequency response curves of two point sources when a baffle with a low-frequency acoustic resistance is set between the two point sources according to some embodiments of the present disclosure. As shown in FIG. 31, in the far field, in a certain frequency range (for example, 20-700 Hz), the volumes of the leaked sounds when the baffle with the low-frequency acoustic resistance or an ordinary baffle is set between the two point sources may be similar to the volumes of the leaked sounds when no baffle is set between the two point sources. As the frequency increases (for example, when the frequency is greater than 700 Hz), the volumes of the leaked sounds when the baffle with the low-frequency acoustic resistance is set between the two point sources may be similar to that when no baffle is set between the two point sources, and the volumes of the leaked sounds when the baffle with the low-frequency acoustic resistance is set between the two point sources may be smaller than that when the ordinary baffle is set between the two point sources, which may indicate that, in mid-high-frequencies, the ability to reduce the sound leakage of the baffle with the low-frequency acoustic resistance may be stronger than that of the ordinary baffle.

A structure of the baffle may affect the volume of the near-field sound and the volume of the far-field leakage of the acoustic output apparatus. In some embodiments, the baffle may be provided with a specific acoustic structure. The specific acoustic structure may act on (for example, absorb, block, etc.) sound passing the baffle to adjust the sound at the listening position, such as increase the volume of the sound at the listening position, enhance or weaken sound in a specific frequency band (e.g., the low-frequency band, the high-frequency band, etc. described in the present disclosure), etc. In order to further illustrate the effect of the acoustic structure of the baffle on sound effects, a detailed description of the acoustic structure may be given below in connection with FIG. 32.

Figure 32:
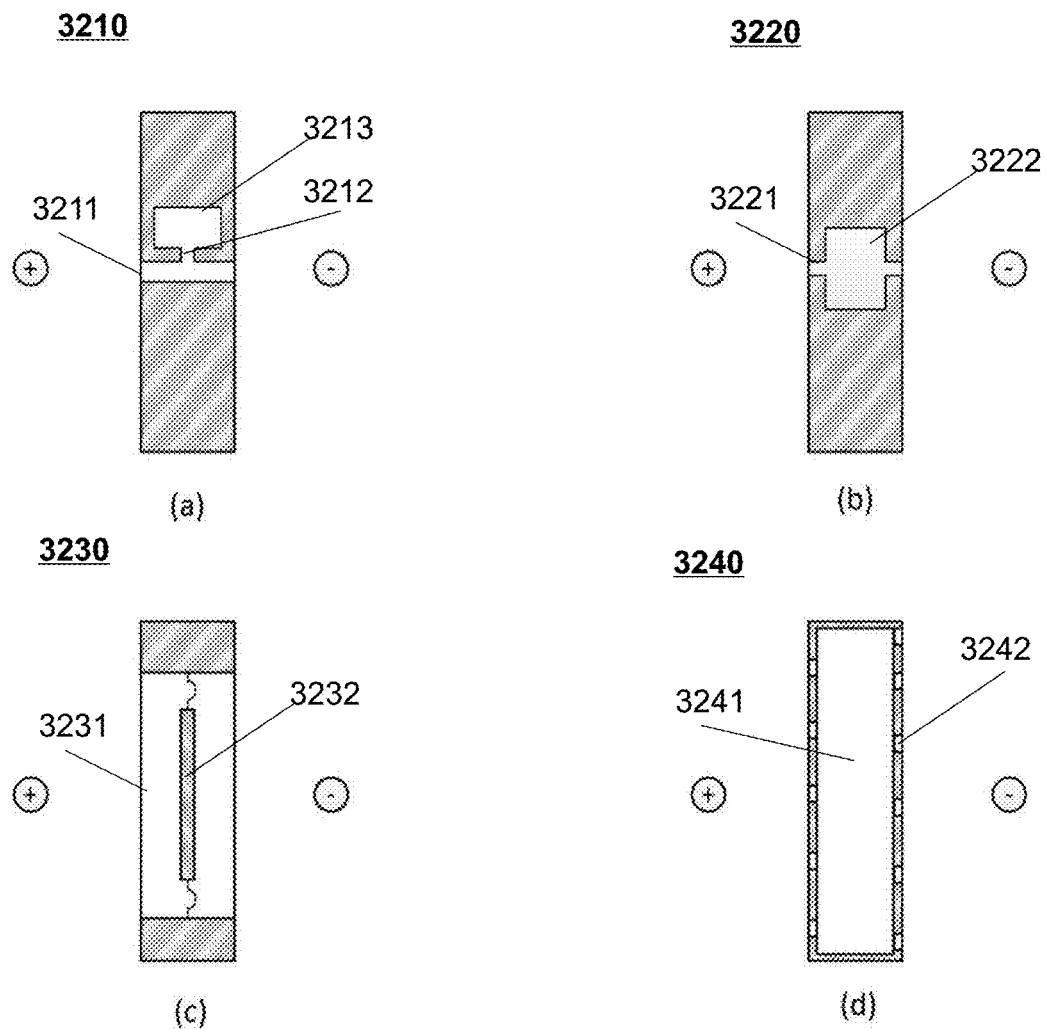
FIG. 32 is a schematic diagram illustrating exemplary acoustic structures of baffles according to some embodiments of the present disclosure.

FIG. 32 is a schematic diagram illustrating exemplary acoustic structures of baffles according to some embodiments of the present disclosure. As shown in (a) in FIG. 32, an acoustic structure 3210 of a baffle may include a sound guiding channel 3211 and a sound cavity structure. The sound guiding channel 3211 may penetrate through the baffle. The sound cavity structure may be arranged along the circumference of the sound guiding channel. The sound cavity structure may be in communication with the sound guiding channel 3211. The sound cavity structure may include a first cavity 3212 and a second cavity 3213. Two ends of the first cavity 3212 may be respectively communicated with the sound guiding channel 3211 and the second cavity 3213. A volume of the second cavity 3213 may be larger than a volume of the first cavity 3212. A count of the acoustic cavity structure may be one or more. When a sound from one side of the baffle passes through the sound guiding channel 3211, sounds with a specific frequency (for example, sounds with a frequency equal to a resonance frequency of the sound cavity structure) may be absorbed by the sound cavity structure, which may reduce the interference and cancellation of the sounds with the specific frequency at the listening position, thereby increasing the volume at the listening position. In some embodiments, by adjusting a size of the sound cavity structure, the resonance frequency of the acoustic cavity structure may be changed, thereby changing the frequency band that the baffle may absorb. In some embodiments, a layer of air-permeable material (for example, cotton cloth, sponge) may be provided at a connection between the sound guiding channel 3211 and the sound cavity structure to widen a range of the resonance frequency of the sound cavity structure, thereby improving the effect of absorbing sound of the sound cavity structure. It should be noted that a cross-sectional shape of the second cavity 3213 may be not limited to a rectangular shape shown in (a) in FIG. 32, and also include other shapes such as a circle, an ellipse, a hexagon, etc. In other embodiments, the sound cavity structure may also be tubular (for example, a sound cavity tube).

As shown in (b) in FIG. 32, an acoustic structure 3220 of a baffle may include a sound guiding channel 3221 and a sound cavity structure 3222. The sound guiding channel 3221 may penetrate through the baffle. The sound cavity structure 3222 may surround an outer side of the sound guiding channel 3221. The sound cavity structure 3222 may be in communication with the sound guiding channel 3221. The sound cavity structure 3222 may be one or more. When a sound from a side of the baffle passes through the acoustic structure 3220, the sound cavity structure 3222 may act as a band-pass filter for the sound, that is, the acoustic structure 3222 may allow sounds with a specific frequency band to pass through and absorb sounds with other frequency bands. Since the passed sounds may cancel other sounds at the listening position, the acoustic structure 3220 may reduce the sounds with the specific frequency band at the listening position. For the absorbed sounds, since the cancellation of the absorbed sounds and other sounds at the listening position is avoided, the acoustic structure 3220 may improve the sounds with the other frequency bands at the listening position.

As shown in (c) in FIG. 32, an acoustic structure 3230 of a baffle may include a sound guiding channel 3231 and a passive vibration diaphragm structure 3232. The passive diaphragm structure 3232 may be vertically arranged inside the sound guiding channel 3231. Two ends of the passive diaphragm structure 3232 may be respectively fixedly connected to an inner wall of the baffle. A count of the passive vibration diaphragm structure 3232 may be one or more. When a sound from a side of the baffle passes through the acoustic structure 3230, the passive diaphragm structure 3232 may filter the sound, thereby enhancing or reducing a sound with a specific frequency in a near field.

As shown in (d) in FIG. 32, an acoustic structure 3240 of a baffle may include a sound cavity structure 3241. The sound cavity structure 3241 may be a cavity in the baffle that is completely or partially hollow. In some embodiments, a plurality of through holes 3242 may be provided on both sidewalls of the baffle. When sounds from a side of the baffle enter the sound cavity structure 3241 through the plurality of through holes 3242, sounds with a specific frequency may directly pass through the acoustic structure 3240, and sounds with other frequencies (for example, the sounds with the same frequency as a resonance frequency of the acoustic structure 3240) may be lost due to the vibration of the air inside the acoustic structure 3240 after entering the sound cavity structure 3241. The sounds with the specific frequency that passes directly through the acoustic structure 3240 may be interfered and canceled with sounds output by other sound guiding holes at the listening position, thereby reducing the volume at the listening position. It should be noted that the count and distribution positions of the through holes 3242 in the acoustic structure 3240 may be adjusted according to specific requirements, which may not be described in detail herein.

The baffle only blocks sounds from the sound guiding hole on one side of the baffle, if sounds with a specific frequency are needed to be enhanced at the listening position, the acoustic structure of the baffle may be set according to one or more of the above manners, so that the acoustic structure may absorb the sounds with the specific frequency. In such cases, it may be possible to avoid the sounds with the specific frequency output by the sound guiding holes on both sides of the baffle from being interfered and canceled at the listening position. Conversely, if the sounds with the specific frequency are needed to be reduced at the listening position, the acoustic structure of the baffle may be set to allow the sounds with the specific frequency to pass through directly.

In some embodiments, the baffle may be provided with an acoustic resistance material for adjusting an acoustic impedance of the baffle. The acoustic resistance material may include plastic, textile, metal, permeable material, woven material, screen material or mesh material, porous material, granular material, polymer material, or the like, or any combination thereof. The acoustic resistance material may have an acoustic impedance. The impedance may be in a range of 5 MKS Rayleigh to 500 MKS Rayleigh.

Figure 33:
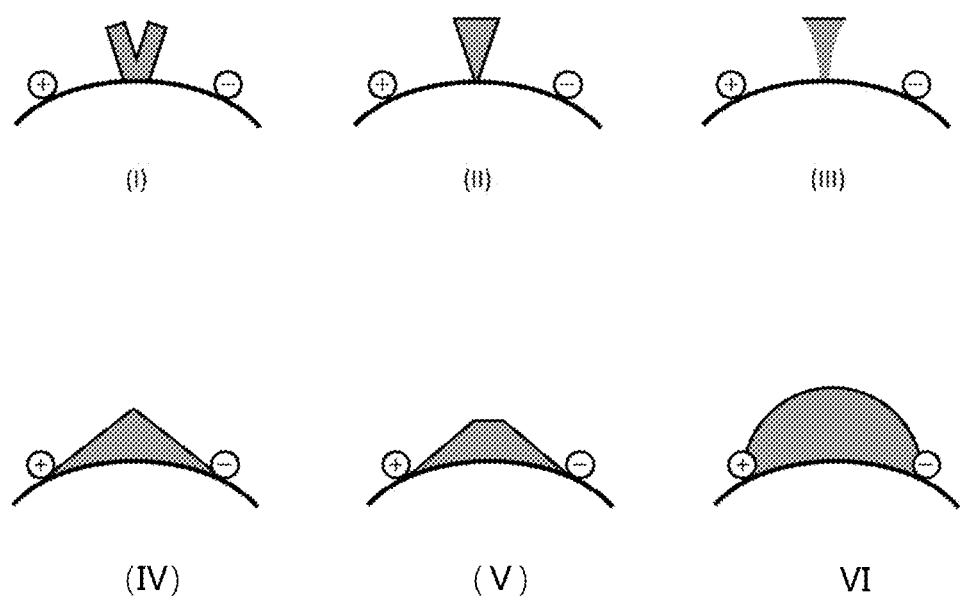
FIG. 33 is a schematic diagram illustrating exemplary structures of baffles with different shapes according to some embodiments of the present disclosure.

FIG. 33 is a schematic diagram illustrating exemplary structures of baffles with different shapes according to some embodiments of the present disclosure. As shown in FIG. 33, in some embodiments, a baffle may be a plate structure with a uniform width or a width that decreases or increases sequentially from top to bottom. The baffle may be a structure with a symmetrical shape. For example, the shape of the baffle may be V-shaped, wedge-shaped, isosceles triangle, trapezoidal, semicircular, or the like, or any combination thereof. The baffle may also be a structure with an asymmetrical shape. For example, the shape of the baffle may be wavy, right-angled triangle, L-shaped, or the like, or any combination thereof. It should be noted that the shape of the baffle may be not limited to the above shape and an elongated shape in FIG. 32. The shape of the baffle may also be other shapes such as a shape with a width at the middle portion greater than a width at both ends, etc. A baffle with any structure capable of blocking sound may be regarded as within the scope of the present disclosure. In addition, the acoustic structure described in FIG. 32 may also be set inside the various baffles shown in FIG. 33.

It should be noted that the above descriptions are merely for the convenience of description, and not intended to limit the present disclosure. It may be understood that, for those skilled in the art, after understanding the principle of the present disclosure, various modifications and changes in the forms and details of the acoustic output apparatus may be made without departing this principle. For example, a count of the acoustic structure may not be limited to one in FIG. 32, but may also be more. When the count of the acoustic structure is more, the acoustic structures may be arranged in sequence along a height direction of the baffle. As another example, the sound guiding channel (for example, the sound guiding channel 3211, the sound guiding channel 3221) may not be parallel to the connection line between the two point sources, but may also intersect the connection line between the two point sources. These changes are all within the protection scope of the present disclosure.

When the acoustic output apparatus has more than two sound guiding holes, that is, there are more than two point sources in the acoustic output apparatus, a baffle may be provided between any two of the plurality of point sources. Through the cooperation of the plurality of point sources and the plurality of baffles, the acoustic output apparatus may achieve a better sound output effect. In some embodiments, the plurality of point sources may include at least one set of two point sources with opposite phases. In order to further explain the coordination of the plurality of point sources and the plurality of baffles in the acoustic output apparatus, a detailed description may be given below in connection with FIG. 33.

Figure 34:
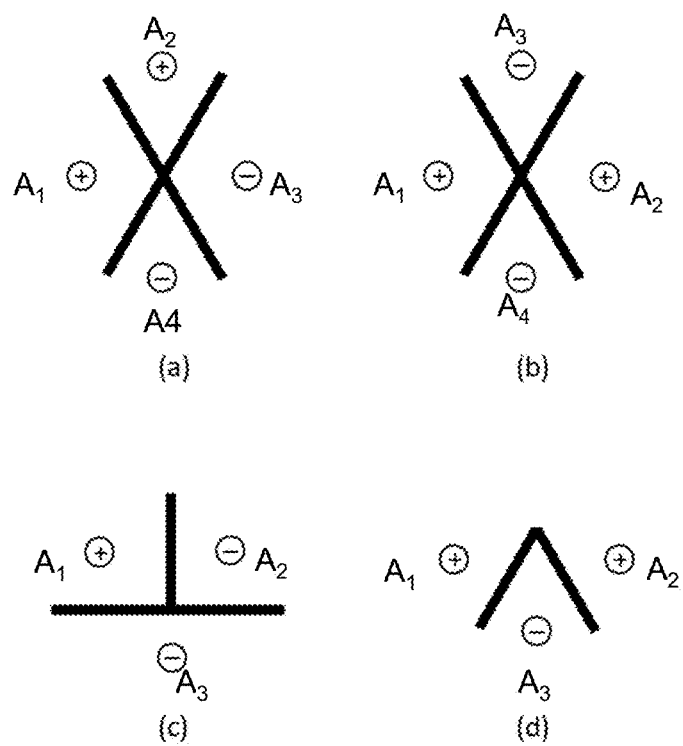
FIG. 34 is a schematic diagram illustrating a distribution of point sources and baffles according to some embodiments of the present disclosure.

FIG. 34 is a schematic diagram illustrating a distribution of point sources and baffles according to some embodiments of the present disclosure. As shown in (a) and (b) in FIG. 34, the acoustic output apparatus may include four point sources (respectively corresponding to four sound guiding holes on the acoustic output apparatus). A point source $A_1$ and a point source $A_2$ may have a same phase. A point source $A_3$ and a point source $A_4$ may have a same phase. The point source $A_1$ and the point source $A_3$ may have opposite phases. The point source $A_1$, the point source $A_2$, the point source $A_3$, and the point source $A_4$ may be separated by two cross-arranged baffles or a plurality of spliced baffles. The point source $A_1$ and the point source $A_3$ (or the point source $A_4$), and the point source $A_2$ and the point source $A_3$ (or the point source $A_4$) may respectively form two point sources as described elsewhere in the present disclosure. As shown in (a) in FIG. 34, the point source $A_1$ and the point source $A_3$ may be arranged opposite to each other, and may be arranged adjacent to the point source $A_2$ and the point source $A_4$. As shown in (b) in FIG. 34, the point source $A_1$ and the point source $A_2$ are arranged opposite to each other, and may be arranged adjacent to the point source $A_3$ and the point source $A_4$. As shown in (c) FIG. 34, the acoustic output apparatus may include three point sources (respectively corresponding to three sound guiding holes on the acoustic output apparatus). A point source $A_1$ and a point source $A_2$ may have opposite phases, and the point source $A_1$ and a point source $A_3$ may have opposite phases, which may form two sets of two point sources as described elsewhere in the present disclosure. The point source $A_1$, the point source $A_2$, and the point source $A_3$ may be separated by two intersecting baffles. As shown in (d) in FIG. 34, the acoustic output apparatus may include three point sources (respectively corresponding to three sound guiding holes on the acoustic output apparatus). A point source $A_1$ and a point source $A_2$ may have a same phase, and the point source $A_1$ and a point source $A_3$ may have opposite phases. The point source $A_1$ and the point source $A_3$, and the point source $A_2$ and the point source $A_3$ may respectively form two point sources as described elsewhere in the present disclosure. The point source $A_1$, the point source $A_2$, and the point source $A_3$ may be separated by a V-shaped baffle.

Figure 35:
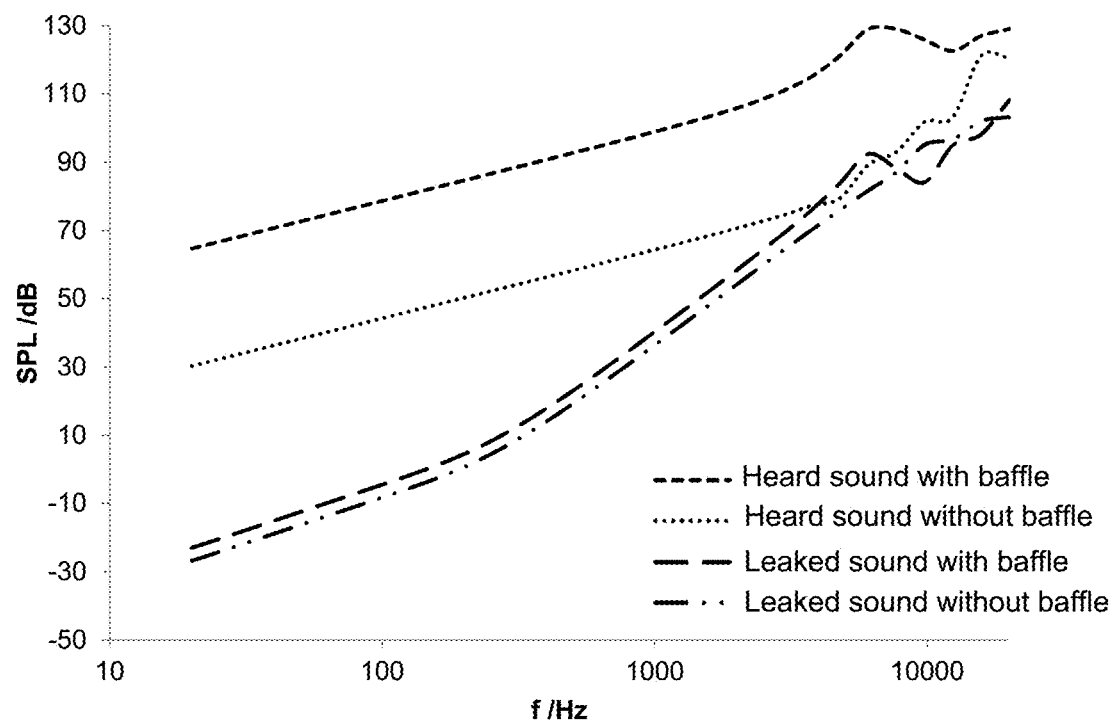
FIG. 35 is a graph illustrating near-field and far-field frequency response curves of multi-point sources with and without baffles between multi-point sources according to some embodiments in FIG. 34.
Figure 36:
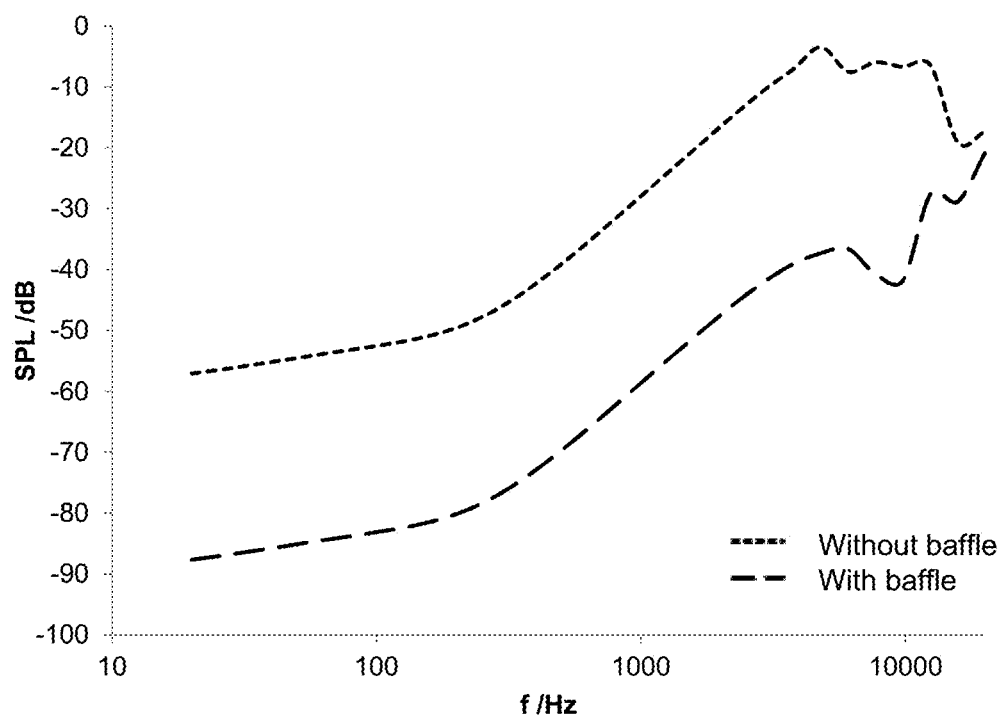
FIG. 36 is a graph illustrating sound leakage indexes of multi-point sources with and without baffles between multi-point according to some embodiments in FIG. 34.

FIG. 35 is a graph illustrating near-field and far-field frequency response curves of multi-point sources with and without baffles between multi-point sources according to some embodiments in FIG. 34. As shown in FIG. 35, in the near field, the volume of the sound heard by the user when baffles are set between the multi-point sources (for example, the point source $A_1$, the point source $A_2$, the point source $A_3$, and the point source $A_4$) may be significantly greater than the volume of the sound heard by the user when no baffle is set between the multi-point sources, which may indicate that the baffles set between multi-point sources may increase the volume of the sound heard by the user in the near field. In the far field, the volume of the leaked sound when the baffles are set between the multi-point sources may be similar to the volume of the leaked sound when no baffle is set between the multi-point sources. FIG. 36 is a graph illustrating sound leakage indexes of multi-point sources with and without baffles between multi-point according to some embodiments in FIG. 34. As shown in FIG. 36, on the whole, the sound leakage indexes when the baffles are set between the multi-point sources may be significantly reduced compared to the sound leakage indexes when no baffle is set between the multi-point sources, which may indicate that the ability to reduce the sound leakage may be significantly enhanced when the baffles are set between the multi-point sources.

Figure 37:
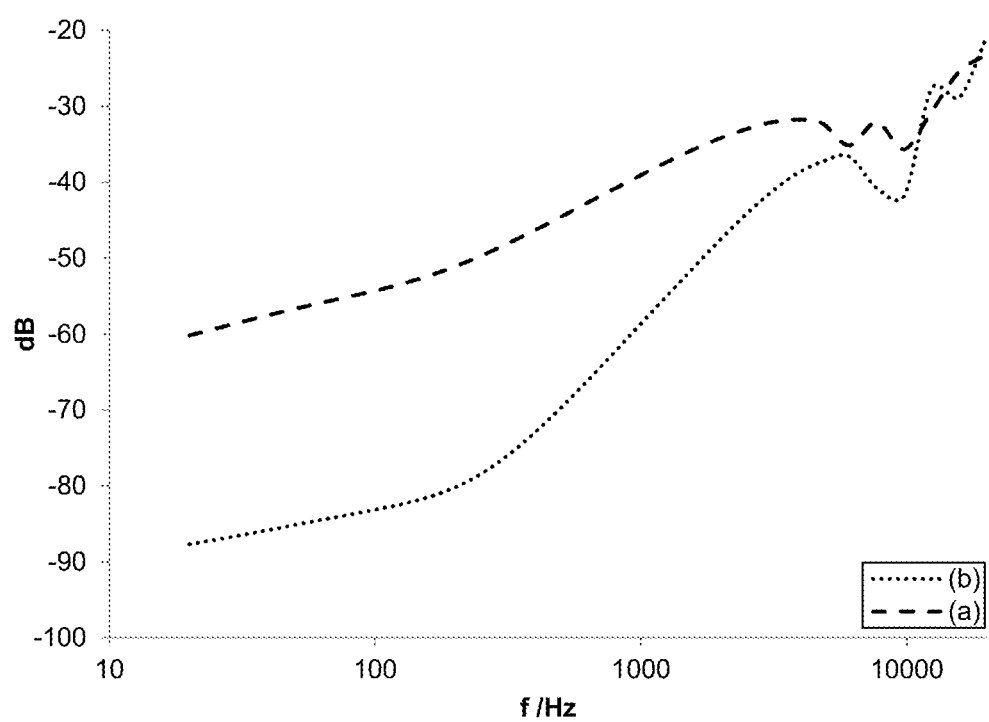
FIG. 37 is a graph illustrating sound leakage indexes of multi-point sources corresponding to two distribution modes shown in (a) and (b) in FIG. 34.

FIG. 37 is a graph illustrating sound leakage indexes of multi-point sources corresponding to two distribution modes shown in (a) and (b) in FIG. 34. As shown in FIG. 37, in a specific frequency range, among the four point sources, the sound leakage indexes ("(b)" shown in FIG. 37) when two point sources (for example, the point source $A_1$ and the point source $A_2$, the point source $A_3$ and the point source $A_4$ in (b) in FIG. 34) with the same phase are arranged opposite to each other on the periphery of the baffle may be significantly smaller than the sound leakage indexes ("(a)" shown in FIG. 37) when two point sources (for example, the point source $A_1$ and the point source $A_3$, the point source $A_2$ and the point source $A_4$ in (a) in FIG. 34) with opposite phases are arranged opposite to each other on the periphery of the baffle, which may indicate that the ability to reduce the sound leakage of the two point sources with the same phase arranged opposite to each other on the periphery of the baffle or the two point sources with the opposite phases arranged adjacently is stronger.

According to the above contents, in some embodiments, when the acoustic output apparatus includes a plurality of sound guiding holes, in order to keep the sound output by the acoustic output apparatus in the near field as loud as possible, and suppress the sound leakage in the far field, a baffle may be provided between any two of the plurality of sound guiding holes, that is, any two of the plurality of sound guiding holes may be separated by the baffle. Preferably, sounds with the same phase (or approximately the same) or opposite (or approximately opposite) phases may be output between the plurality of sound guiding holes. More preferably, the sound guiding holes that output sounds with the same phase may be arranged oppositely, and the sound guiding holes that output sounds with opposite phases may be arranged adjacently.

Figure 38:
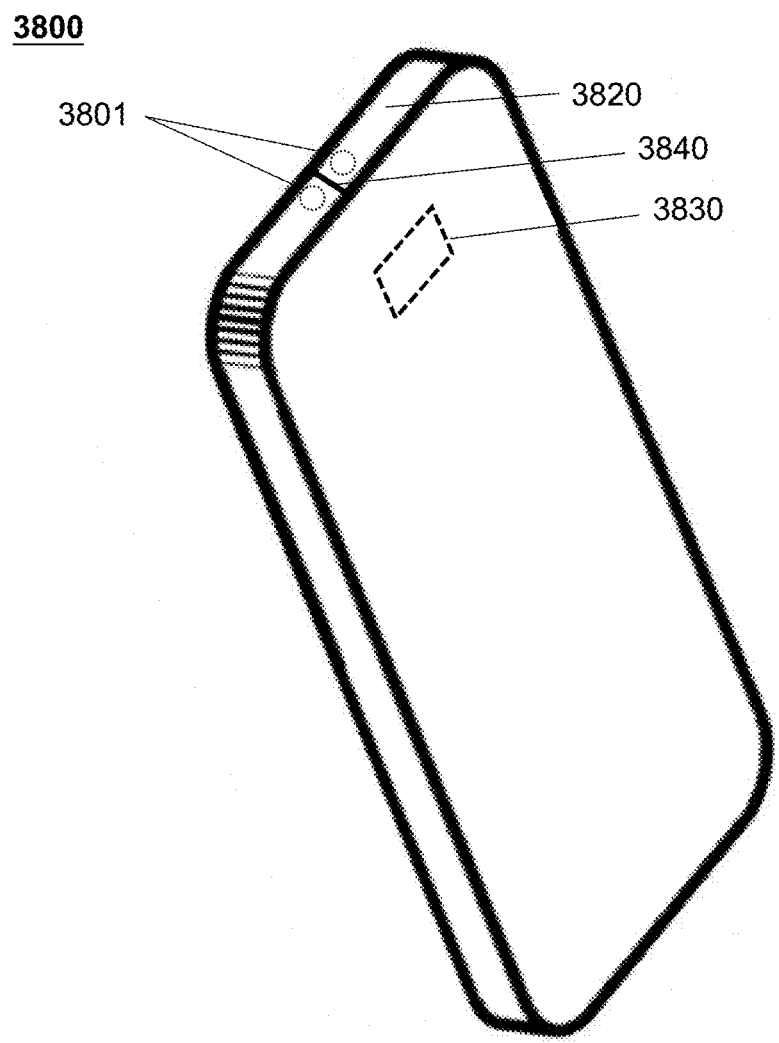
FIG. 38 is a schematic diagram illustrating a phone having sound guiding holes according to some embodiments of the present disclosure.

It should be noted that the descriptions of the present disclosure may not limit an actual use scenario of the acoustic output apparatus. The acoustic output apparatus may be any apparatus outputting the sound or a portion thereof. FIG. 38 is a schematic diagram illustrating a phone having sound guiding holes according to some embodiments of the present disclosure. As shown in FIG. 38, a plurality of sound guiding holes as described elsewhere in the present disclosure may be arranged on a top 3820 (that is, an upper end perpendicular to a display of the phone 3820 of a phone 3800. Merely by way of example, sound guiding holes 3801 may constitute a set of two point sources (or an array of point sources) for outputting sounds. A baffle 3840 may be provided between the sound guiding holes 3801. An acoustic driver 3830 may be provided inside a housing of the phone 3800. The sounds generated by the acoustic driver 3830 may be transmitted outward through the sound guiding holes 3801.

In some embodiments, the sound guiding holes 3801 may output a set of sounds with the opposite phase (or approximately the opposite) and the same (or approximately the same) amplitude. When a user places the sound guiding holes 3801 near an ear to receive voice information, according to the descriptions of other embodiments in the present disclosure, the baffle 3840 may "block" between one of the sound guiding holes 3801 and the user's ear, which may be equivalent to increasing an acoustic distance of the sound from the sound guiding hole to the user's ear, so that the sound guiding holes 3801 may output strong near-field sound to the user. Meanwhile, the baffle 3840 may have little effect on sounds output by the sound guiding holes in a far field, so that due to the interference and cancellation of the sounds in the far field, the sound guiding holes 3801 may reduce sound leakage to the surrounding environment. In addition, by arranging the sound guiding holes on the top portion of the phone instead of an upper portion of the display of the phone, a space on a front of the phone may be saved. Therefore, an area of the display of the phone may be further increased and the appearance of the phone more concise and beautiful.

It should be understood that the above descriptions of the sound guiding holes on the phone are merely for illustration purposes. Those skilled in the art may make various modifications to the above structures. The modified structures may be within the protection scope of the present disclosure. For example, all or a portion of the sound guiding holes 3801 may also be set at other positions of the phone 3800, which may still ensure that the user may hear a relatively loud volume when receiving voice information while avoiding leakage of the voice information to the surrounding environment. For example, a first sound guiding hole may be arranged on the top 3820 (relatively close to the user's ear), and a second sound guiding hole may be arranged on a back or a side of the phone 3800 (relatively away from the user's ear). When the user places the first sound guiding hole near the ear to receive the voice information, the housing of the phone 3800 may be equivalent to a "baffle" that "blocks" between the second sound guiding hole and the user's ear, which may add an acoustic distance from the second sound guiding hole to the user's ear. Therefore, a volume heard by the user's ear may be increased. As another example, acoustic drivers that output sounds in different frequency ranges may be disposed inside the housing of the phone 3800, and sound guiding holes corresponding to these acoustic drivers may be provided with or without baffles in the manner described above.

It should be noted that the above descriptions are merely for the convenience of description, and not intended to limit the present disclosure. It may be understood that, for those skilled in the art, after understanding the principle of the present disclosure, various modifications and changes in the forms and details of the acoustic output apparatus may be made without departing from this principle. For example, a count of point sources may be not limited to the above two, three or four, but may also be five, six, seven, or more. A specific distribution form of the point sources and a structure and shape of the baffle may be adjusted according to different counts of point sources. As another example, the shape of the baffle may be not limited to a straight plate shown in some figures in the present disclosure, and the baffle may also be a curved plate with a certain curvature. These changes are all within the protection scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic output apparatus, comprising:
   at least one acoustic driver configured to generate sound that is output through at least two sound guiding holes; and
   a supporting structure suitable for wearing on a user's body and configured to support the at least one acoustic driver, wherein the supporting structure functions as a baffle to increase an acoustic distance from one of the at least two sound guiding holes to the user's ear, and a ratio of a height of the baffle to a distance between the at least two sound guiding holes is less than or equal to 2.

2. The acoustic output apparatus of claim 1, wherein the ratio of the height of the baffle to the distance between the at least two sound guiding holes is less than or equal to 1.8.

3. The acoustic output apparatus of claim 1, wherein the ratio of the height of the baffle to the distance between the at least two sound guiding holes is less than or equal to 1.

4. The acoustic output apparatus of claim 1, wherein
   the at least one acoustic driver includes a vibration diaphragm,
   a front side of the vibration diaphragm in the supporting structure is provided with a front chamber for transmitting sound, the front chamber being acoustically coupled with one sound guiding hole of the at least two sound guiding holes, and
   a rear side of the vibration diaphragm in the supporting structure is provided with a rear chamber for transmitting sound, the rear chamber being acoustically coupled with another sound guiding hole of the at least two sound guiding holes.

5. The acoustic output apparatus of claim 4, wherein the at least two sound guiding holes output at least one set of sounds with opposite phases.

6. The acoustic output apparatus of claim 1, wherein the at least two sound guiding holes output at least one set of sounds having a phase difference.

7. The acoustic output apparatus of claim 1, wherein the supporting structure is configured such that each of the at least two sound guiding holes is located on a front side of the user's ear.

8. The acoustic output apparatus of claim 1, wherein
   one of the at least two sound guiding holes is located on a side of the supporting structure facing the user's ear, and
   another one of the at least two sound guiding holes is located on a side of the supporting structure facing away from the user's ear.

9. The acoustic output apparatus of claim 1, wherein a distance between the at least two sound guiding holes is less than or equal to 6 cm.

10. The acoustic output apparatus of claim 1, wherein a ratio of a distance between a structural center of the supporting structure and a connection line between the at least two sound guiding holes to the height of the baffle is less than or equal to 2.

11. The acoustic output apparatus of claim 1, wherein a ratio of a distance between a structural center of the supporting structure and a connection line between the at least two sound guiding holes to the height of the baffle is less than or equal to 1.5.

12. The acoustic output apparatus of claim 1, wherein a ratio of a distance between a structural center of the supporting structure and a connection line between the at least two sound guiding holes to the height of the baffle is less than or equal to 1.

13. The acoustic output apparatus of claim 1, wherein a ratio of a distance between a structural center of the supporting structure and a connection line between the at least two sound guiding holes to the height of the baffle is less than or equal to 0.5.

14. The acoustic output apparatus of claim 1, wherein a ratio of a distance between a structural center of the supporting structure and a connection line between the at least two sound guiding holes to the height of the baffle is less than or equal to 0.3.

15. The acoustic output apparatus of claim 1, wherein the at least two sound guiding holes are located on a same side of the user's ear, a ratio of a distance between a sound guiding hole, which is closer to the user's ear, of the at least two sound guiding holes and the user's ear to a distance between the at least two sound guiding holes being less than or equal to 3.

16. The acoustic output apparatus of claim 15, wherein one of the at least two sound guiding holes is located on a front side of the user's ear, and another one of the at least two sound guiding holes is located on a back side of the user's ear.

17. The acoustic output apparatus of claim 1, wherein the at least two sound guiding holes are set horizontally.

18. The acoustic output apparatus of claim 1, wherein the supporting structure is made of acoustic resistance material.

19. The acoustic output apparatus of claim 18, wherein the acoustic resistance material includes at least one of plastic, textile, metal, permeable material, woven material, screen material, mesh material, porous material, particulate material, or polymer material.

20. The acoustic output apparatus of claim 18, wherein the acoustic resistance material has acoustic impedance, the acoustic impedance being in a range of 5-500 MKS Rayleigh.

* * * * *